United States Patent
Takenaka et al.

(10) Patent No.: US 8,037,312 B2
(45) Date of Patent: Oct. 11, 2011

(54) METHOD AND APPARATUS FOR DIGITAL SIGNATURE AUTHENTICATION, AND COMPUTER PRODUCT

(75) Inventors: Masahiko Takenaka, Kawasaki (JP); Tetsuya Izu, Kawasaki (JP); Takashi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 939 days.

(21) Appl. No.: 11/984,314

(22) Filed: Nov. 15, 2007

(65) Prior Publication Data

US 2008/0256362 A1 Oct. 16, 2008

(30) Foreign Application Priority Data

Jan. 22, 2007 (JP) ................................. 2007-012048

(51) Int. Cl.
*H04L 9/32* (2006.01)
(52) U.S. Cl. ........................ 713/177; 713/180
(58) Field of Classification Search ............. 713/176, 713/177, 180; 726/10
See application file for complete search history.

(56) References Cited

U.S. PATENT DOCUMENTS

| | | | |
|---|---|---|---|
| 6,959,384 B1 | 10/2005 | Serret-Avila | |
| 7,512,801 B1 | 3/2009 | Akiyama | 713/176 |
| 2001/0043616 A1 | 11/2001 | Hild et al. | |
| 2006/0136728 A1* | 6/2006 | Gentry et al. | 713/176 |
| 2006/0204008 A1 | 9/2006 | Matsushita | 380/255 |
| 2007/0005499 A1* | 1/2007 | Gentry et al. | 705/51 |

FOREIGN PATENT DOCUMENTS

| | | |
|---|---|---|
| JP | 2000-286836 | 10/2000 |
| JP | 2001-519930 | 10/2001 |
| JP | 2006-60722 | 3/2006 |
| JP | 2006-253822 | 9/2006 |
| WO | 99/40702 | 8/1999 |
| WO | 2005/017809 | 2/2005 |

OTHER PUBLICATIONS

Takashi Yoshioka et al., "Proposal on Partial Integrity Assurance Technology that Considers Correction and Distribution for Electronic Documents" FIT 2004 The $3^{rd}$ Forum on Information Technology; pp. 231-232.
Extended European Search Report, mailed Sep. 3, 2009, in corresponding European Application No. 0815220.3 (8 pp.).
Takashi Yoshida et al., "Proposal on Partial Integrity Assurance Technology that Considers Correction and Distribution for Electronic Documents" FIT 2004 The $3^{rd}$ Forum on Information Technology; pp. 231-232.
Izu, T. et al., *PIATS: A Partially Sanitizable Signature Scheme*, LNCS, 2005, vol. 3783, pp. 72-83.
Notice of Rejection, mailed May 12, 2009, in corresponding Japanese Application No. 2007-012048 (12 pp. including translation).
Wong, C. et al., *Digital Signatures for Flows and Multicasts*, IEEE/ACM Transactions on Networking, vol. 7, No. 4, Aug. 1999, pp. 502-513.

* cited by examiner

*Primary Examiner* — Gilberto Barron, Jr.
*Assistant Examiner* — Malcolm Cribbs
(74) *Attorney, Agent, or Firm* — Staas & Halsey LLP

(57) ABSTRACT

An apparatus for digital signature authentication includes a dividing unit that divides streaming data into plural pieces of partial data in a predetermined unit; a first creating unit that creates a hash value string including plural hash values corresponding to the pieces of partial data; a second creating unit that creates a first binary tree using the hash value string; and a third creating unit that creates a digital signature of a signer using a root value of the first binary tree.

8 Claims, 27 Drawing Sheets

FIG.29

| DATA | PROCESS | PIAT | | PRESENT INVENTION | |
|---|---|---|---|---|---|
| | | DATA AMOUNT | CALCULATION AMOUNT | DATA AMOUNT | CALCULATION AMOUNT |
| HASH VALUE | SIGNATURE | n | nH | 0 | $\leq 2nH$ |
| | EXTRACTION | m | 0 | $\leq 2\log_2((m-n)/2)$ | $\leq 2(n-m)H$ |
| RANDOM NUMBER VALUE | SIGNATURE | n | nR | 1 | $\leq R+2(n-1)H$ |
| | EXTRACTION | m | 0 | $\leq 2\log_2(m+2)-2$ | $\leq 2mH$ |

“XXXXXXX”, that can be identified as concealment.
METHOD AND APPARATUS FOR DIGITAL SIGNATURE AUTHENTICATION, AND COMPUTER PRODUCT

CROSS-REFERENCE TO RELATED APPLICATIONS

This application is based upon and claims the benefit of priority from the prior Japanese Patent Application No. 2007-012048, filed on Jan. 22, 2007, the entire contents of which are incorporated herein by reference.

BACKGROUND OF THE INVENTION

1. Field of the Invention

The present invention relates to a technology for digital signature authentication.

2. Description of the Related Art

It has become a common practice to install a security camera in shops, downtown areas, and apartments, or to install a drive recorder in commercial vehicles. Accordingly, moving images are increasingly used as an evidential matter. Moreover, it has also become common to keep a record of conversation between a customer and an operator to deal with troubles in telephone transactions or in a customer support operation.

Currently, when a moving image or audio data is used as an evident, a video tape, an image, or an audio file is provided as it is. However, if stored images and audio data are digitized, it becomes easy to tamper or edit such data. Therefore, third-party authentication such as a signature and a timestamp becomes necessary. A service and a product to record sound of a telephone operator are actually provided, and needs for such a technology are expected to increase.

On the other hand, protection of privacy is another problem for increasing security cameras in using a shot image, and is discussed. In addition, since Private Information Protection Law is enforced, use of private information of an individual has been strictly limited and disclosure or partial deletion of information is required if the individual requests.

To protect privacy while maintaining adequacy as an evidential matter, a signature technology is studied in which partial guaranteeing of an original content is enabled that guarantees a part of an electronic document to maintain its original content, and in which concealment of a part of the electronic document is enabled. A signature technique in which addition, alteration, concealment (sanitization), and deletion are enabled on a part of a document to which a digital signature is applied while guaranteeing that the document maintains its original content is disclosed in the third Forum of Information Technology FIT 2004, M-066, 2004, "Proposal of a Partial Integrity Assurance Technology Considering Correction and Circulation of Electronic Documents" by Takashi Yoshioka and Masahiko Takenaka, and in Japanese Patent Laid-Open Publication No. 2006-60722.

By using such a technique, signature verification of a digital-signed electronic document becomes possible even in a state where a part of the document is concealed. Furthermore, it is possible to verify that no change has been made in the document except a concealed part (also "altered part" or "added part" in the technique disclosed in "Proposal of a Partial Integrity Assurance Technology Considering Correction and Circulation of Electronic Documents") by a third party.

The signature technique disclosed in "Proposal of a Partial Integrity Assurance Technology Considering Correction and Circulation of Electronic Documents" is explained. This signature technique is a partial integrity assurance technology called PIAT, and partial integrity assurance of electronic data being a subject of signature is performed in a trilateral model of a signer, an extractor, and a verifier.

The signer is a person that digitally signs electronic data being a subject of signature, or a computer that is operated by the person. The signer guarantees a content of the electronic data by signing the data. It is necessary to sign the data under such a condition that which part is to be extracted from the subject of signature is unpredictable.

The extractor is a person that extracts (conceals or alters) a part from the electronic data being a subject of signature, or a computer that is operated by the person. The extractor extracts a part of the electronic data digitally signed by the signer and discloses the extracted part to the verifier. The extracted electronic data is referred to as extraction data. There are two kinds of extracting methods, onymous extraction and anonymous extraction. In the anonymous extraction, the extractor performs an extracting process under anonymity. In the onymous extraction, the extractor discloses information on the extractor so that who has performed the extracting process is specified.

The verifier is a person that verifies whether the extraction data is guaranteed by the signer, or a computer that is operated by the person. In the case of the anonymous extraction, it is verified whether the extraction data is a part of the electronic data signed by the signer. In the case of the onymous extraction, it is verified whether the extracting process is performed by the extractor as well as whether the extraction data is a part of the electronic data signed by the signer.

FIG. 22 is a schematic diagram showing an outline of algorism for a signer in PIAT. The signer divides an electronic document (entire character string) 2200 into partial data (character strings of respective lines), and calculates a hash value of each partial data to create a hash value set 2201. The digital signature of the signer is given to the hash value set 2201. A combination of the hash value set 2201 and a digital signature 2202 of the signer is a PIAT signature 2203 of the signer.

FIG. 23 is a schematic diagram showing an outline of algorism for an extractor in PIAT. The extractor extracts partial data (extraction data 2300) from the data to which the PIAT signature is given by the signer. Thereafter, the extractor performs the same operation as that performed by the signer. A combination of a hash value set 2301 thus obtained and a digital signature 2302 of the extractor is a PIAT signature 2303 of the extractor. When a deleted part is wished to be specified, a concealing process is performed, and partial data after deletion is modified to partial data, such as "XXXXXXX", that can be identified as concealment.

FIG. 24 is a schematic diagram showing an outline of algorism for a verifier in PIAT. The verifier first verifies integrity of the hash value sets 2201 and 2301 from the PIAT signatures of the signer and the extractor. The verifier then creates a hash value set 2301 from the disclosed extraction data 2300, and verifies whether the hash value set 2301 thus created and the hash value set 2301 included in the PIAT signature 2303 of the extractor coincide with each other.

Finally, the verifier compares the hash value set 2201 of the signer and the hash value set 2301 of the extractor. It is found that a position of data at which the hash value is identical in both of the hash value sets 2201 and 2301 is a position of data extracted from the electronic document. If the hash value set 2301 of the extraction data 2300 is not included in the hash value set 2201 of the PIAT signature 2203 of the signer, it is determined that the extraction data 2300 is tampered.

In PIAT, extraction is performed basically by the onymous extraction, and therefore, it is possible to verify who has extracted which part. However, in the case of the anonymous extraction, the PIAT signature process performed by the extractor can be omitted. In this case, the verifier performs verification of the hash value set in the PIAT signature of the signer and the digital signature thereof, creation of a hash value set from the disclosed extraction data, and comparison with the hash value set in the PIAT signature of the signer.

This signature technique (PIAT) can be applied also to streaming data including a moving image file such as moving picture experts group phase 1 (MPEG-1) and an audio file.

In this case, streaming data being a subject of signature is divided into partial data. When streaming data of MPEG-1 is divided into partial data so as to be extractable, the data can be divided in an image unit or in a group of picture (GOP) unit.

However, in MPEG-1, since an interframe prediction technology is applied, P-frame and B-frame lack independency in an image unit. Therefore, extraction is considered to be limited. On the other hand, GOP is a smallest unit of a moving image in which several images are combined, and independent reproduction in this unit is possible. GOP is a structure for reproducing or editing a moving image from a middle of data. For simplicity, it is assumed that division into partial data is performed in the GOP unit.

The signer divides a moving image (for example, an MPEG-1 file) being a subject of signature in GOP units, and calculates a hash value of each GOP to create a hash value set. The signer then gives a digital signature of the signer to the created hash value set, to create a PIAT signature by combining the hash value set and the digital signature.

The extractor extracts a required partial moving image from the moving image to which the PIAT signature is given by the signer. In the case of the anonymous extraction, the extractor discloses the extracted moving image and the PIAT signature of the signer. In the case of the onymous extraction, the extractor performs the same operation as that performed by the signer, to create a PIAT signature of the extractor, and discloses the extracted moving image, the PIAT signature of the signer, and the PIAT signature of the extractor.

In the case of the onymous extraction, the verifier first verifies integrity of the hash value set from the PIAT signature of the signer and the PIAT signature of the extractor. The verifier then creates a hash value set from the disclosed extracted moving image, and verifies that the hash value set thus created coincides with the hash value set included in the PIAT signature of the extractor.

Finally, the verifier compares the hash value set of the signer and the hash value set of the extractor. It is found that a position of data at which the hash value is identical in both of the hash value sets is a position of data extracted from the moving image being the subject of signature. In the case of the anonymous extraction, the verifier performs verification of the hash value set in the PIAT signature of the signer and the digital signature thereof, creation of a hash value set from the disclosed extracted moving image, and comparison with the hash value set in the PIAT signature of the signer, to check whether it is partial information.

Next, the signature technique disclosed in Japanese Patent Laid-Open Publication No. 2006-60722 is explained. In this signature technique, an amount of data related to signature can be reduced by managing hash values, which are a part of the data related to signature, in a binary tree, and data to be a subject of signature includes not only electronic documents but also streaming data such as a moving image and audio data, similarly to PIAT described above. Herein, an example in which the subject of signature is streaming data of a moving image is explained.

FIG. 25 is a schematic diagram for explaining a signing process performed by a signer in the signature technique disclosed in Japanese Patent Laid-Open Publication No. 2006-60722 in which streaming data of a moving image is the subject of signature. In this technique, hash values $h_1$ to $h_5$ of partial moving images $f_1$ to $f_5$ obtained by dividing a moving image file F being a subject of the signature by GOP units are managed in a complete binary tree. This requires addition of dummy data D.

The signer first adds the dummy data D at the end of the moving image file F, and calculates hash values $h_1$ to $h_8$ for each GOP as a process of the first level. As a process of the second level, the signer then connects the end of a hash value $h_x$ and the head of $h_y$ to calculate a new hash value $h_{x,y}$. The hash value $h_x$ and the hash value $h_y$ are adjacent values.

The same process is repeated in the third level and later until a single hash value is obtained. Thus, a hash-value binary tree T is created. The single hash value is referred to as root Ra. In the example shown in FIG. 25, the root Ra is obtained in the fourth level. The signer gives a digital signature Sa of the signer to the root Ra.

Disclosure information A that is stored at this time includes the original moving image file F, the dummy data D (or a root hash value string $\{h_6, h_{7,8}\}$ having hash values of the partial moving images $f_6$ to $f_8$ of the dummy data D as leaves), and the root Ra to which the digital signature Sa is given.

FIG. 26 is a schematic diagram for explaining an extracting process performed by an extractor in the signature technique disclosed in Japanese Patent Laid-Open Publication No. 2006-60722 in which streaming data of a moving image is the subject of signature. The extractor extracts the partial moving images $f_3$ and $f_4$ from the moving image file F being a subject of signature, and calculates the hash values $h_1$ to $h_8$ of the partial moving images $f_1$ to $f_8$ of the moving image file F and the dummy data D as a process of the first level. The extractor then deletes all partial moving images $f_1$, $f_2$, and $f_5$ to $f_8$ except the extracted partial moving images $f_3$ and f4.

Thereafter, the extractor connects the end of the hash value $h_x$ and the head of the hash value $h_y$ to create a new hash value $h_{x,y}$, and repeats the same process in the second level and later until a single hash value is obtained. Thus, the hash-value binary tree T is created. In the example shown in FIG. 26, a root Rb is created with the hash value obtained in the fourth level. The extractor gives a digital signature Sb of the extractor to the root Rb.

Signature related data B disclosed at this time includes the extracted moving images $f_3$ and $f_4$, root hash values $h_{1,2}$ and $h_{5,8}$ that are obtained from the hash values of the deleted partial moving images $f_1$, $f_2$, and $f_5$ to $f_8$, and the root Rb to which the digital signature Sb is given.

However, in the signature technique described above, when a part of large streaming data such as a moving image file and an audio file is extracted, it is necessary to store all of hash values of moving images other than the extracted moving image. Therefore, an amount of data related to signature is enormous.

Moreover, in the signature technique disclosed in Japanese Patent Laid-Open Publication No. 2006-60722, although it is possible to reduce an amount of data related to signature by managing hash values, which are a part of the data related to signature, in a binary tree, addition of dummy data is required to manage the hash values in a complete binary tree.

Accordingly, an amount of data to be stored increases due to added dummy data D (the dummy data D or a hash value group of a hash tree T constituted only of the dummy data D).

Furthermore, since the dummy data D is added, calculation of hash values therefor is required, and as a result, a processing time also increases. In addition, falsification (curtailment) of the moving image file being the subject of signature is possible by replacing data at the end of the moving image file with the dummy data.

Moreover, random numbers that are included in the signature related data required to guarantee uniqueness of the extracted partial moving images $f_3$ and $f_4$ are also required to be stored as they are. FIG. 27 is a schematic diagram for showing random numbers that are added to the partial moving images $f_1$ to $f_5$. As shown in FIG. 27, although it is possible to unify the hash values $h_1$ to $h_5$ of the respective partial moving images $f_1$ to $f_5$ in units of GOP into a single hash value h, the same number of random numbers $r_1$ to $r_5$ as the number of the partial moving images $f_1$ to $f_5$ are required. As a result, an amount of the signature related data becomes enormous.

As described above, if PIAT is simply applied to streaming data such as a moving image file, even if a part of the data is extracted, the data can be guaranteed as a part of the moving image file being the subject of signature.

However, as described above, when the moving image file being the subject of signature is a moving image file with a long recording time or a moving image file having a high frame rate, the number of frames or GOP becomes large. As a result, an amount of data of a hash value set included in the PIAT signature increases.

Furthermore, when a content of the moving image file being the subject of signature is an animation, the same frame or GOP appears repeatedly. In PIAT, if the same image appears in partial data, a moving image corresponding to the deleted part can be restored based on a hash value set. To guarantee uniqueness of the partial data, if the same image appears in the partial data, a random number is required to be added for each of original partial data.

FIG. 28 is a schematic diagram showing a moving image file of an animation. As shown in FIG. 28, even if images $E_1$ and $E_2$ are deleted, when the hash values $h_1$ to $h_3$ of images $E_1$ to $E_3$ are the same, the deleted image $E_1$ and $E_2$ can be restored based on the hash value of the image $E_3$ since the deleted images $E_1$ and $E_2$ are identical to the image $E_3$. To prevent such restoration, it is necessary to add a random number to each of the images $E_1$ and $E_4$.

However, when random numbers are added, data of the number of GOP×random number length are further required to be stored. Therefore, data other than the moving images to be stored further increases. For example, when a PIAT signature is given to a moving image of one hour long having a frame rate equivalent to that of television, the signature data requires several hundred kilobytes to several megabytes. The amount of data is small compared to that of the image data, however, the amount of signature related data increases.

SUMMARY OF THE INVENTION

It is an object of the present invention to at least solve the problems in the conventional technologies.

A computer-readable recording medium according to one aspect of the present invention stores therein a computer program for digital signature authentication. The computer program causes a computer to execute dividing streaming data into plural pieces of partial data in a predetermined unit; creating a hash value string including plural hash values corresponding to the pieces of partial data; creating a first binary tree using the hash value string; and creating a digital signature of a signer using a root value of the first binary tree.

An apparatus according to another aspect of the present invention is for digital signature authentication. The apparatus includes a dividing unit that divides streaming data into plural pieces of partial data in a predetermined unit; a first creating unit that creates a hash value string including plural hash values corresponding to the pieces of partial data; a second creating unit that creates a first binary tree using the hash value string; and a third creating unit that creates a digital signature of a signer using a root value of the first binary tree.

A method according to still another aspect of the present invention is of digital signature authentication. The method includes dividing streaming data into plural pieces of partial data in a predetermined unit; creating a hash value string including plural hash values corresponding to the pieces of partial data; creating a first binary tree using the hash value string; and creating a digital signature of a signer using a root value of the first binary tree.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 29 is a table showing effects when a PIAT signature is given to streaming data of a moving image.

DETAILED DESCRIPTION OF THE PREFERRED EMBODIMENTS

Exemplary embodiments according to the present invention are explained in detail below with reference to the accompanying drawings.

Figure 1:
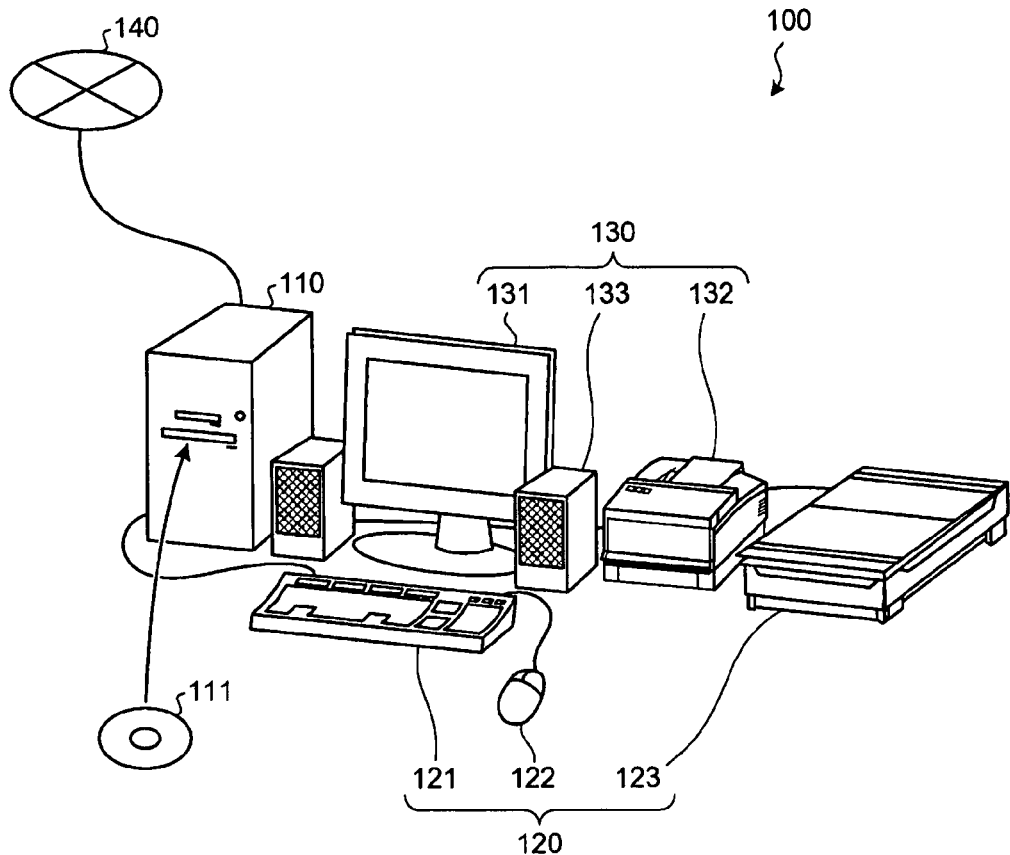
FIG. 1 is a schematic diagram showing a hardware configuration of an apparatus for digital signature authentication according to an embodiment of the present invention.

FIG. 1 is a schematic diagram showing a hardware configuration of an apparatus for digital signature authentication according to an embodiment of the present invention. An apparatus for digital signature authentication 100 includes a computer main unit 110, an input unit device 120, and an output device 130. The apparatus can be connected to a network 140 such as a local area network (LAN), a wide area network (WAN), and the internet through a router or a modem not shown.

The computer main unit 110 includes a central processing unit (CPU), a memory, and an interface. The CPU controls the entire apparatus 100. The memory is structured with a read only memory (ROM), a random access memory (RAM), a hard disk (HD), an optical disk 111, and a flash memory. The memory is used as a work area of the CPU.

Various kinds of programs are store in the memory, and are loaded according to a command from the CPU. Reading and writing of data from the HD and the optical disk 111 are controlled by a disk drive. The optical disk 111 and the flash memory are detachable to the computer main unit 110. The interface controls input from the input device 120, output to the output device 130, and communication with the network 140.

The input device 120 includes a keyboard 121, a mouse 122, and a scanner 123. The keyboard 121 has keys to input characters, numerals, and various instructions. Data is input using the keyboard 121. The keyboard can be a touch panel. The mouse 122 enables to move a cursor, to select a range, to move a window, and to change the size of the window. The scanner 123 optically reads an image. The read image is captured as image data and stored in a memory of the computer main unit 110. The scanner 123 can be provided with an optical character recognition (OCR) function.

The output device 130 includes a display 131, a printer 132, and a speaker 133. The display 131 displays a cursor, an icon, and data such as a document, an image, and functional information. The printer 132 prints image data and document data. The speaker 133 outputs sound such as a sound effect and reading sound.

The apparatus 100 performs a signature process, an extraction process, and a verification process. Functional configurations are explained for the respective processes herein.

Figure 2:
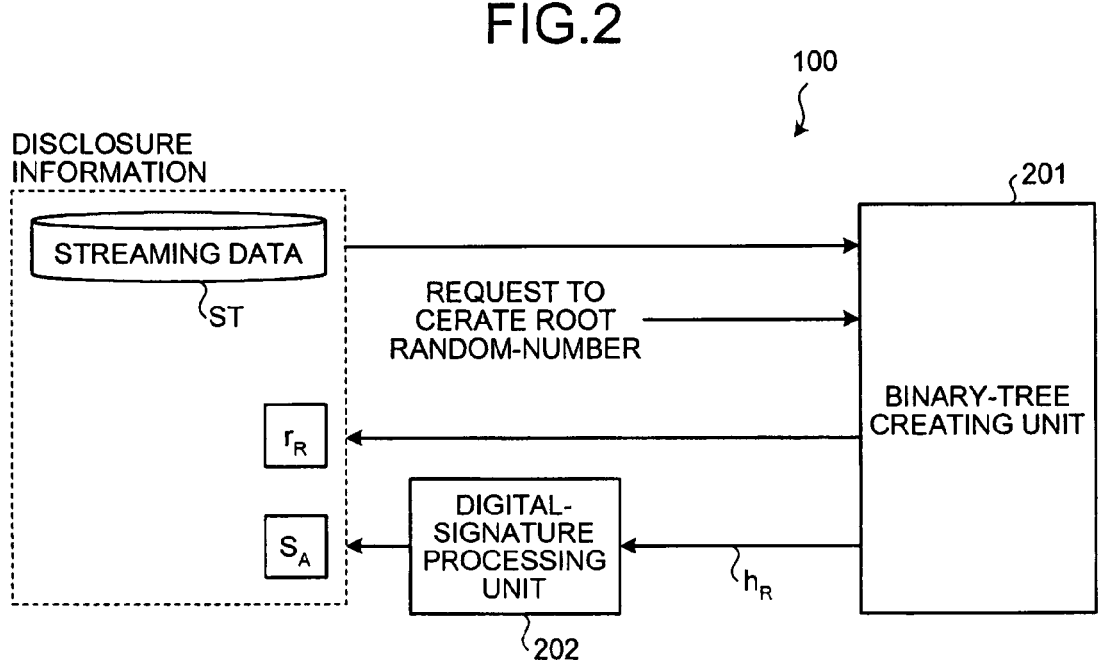
FIG. 2 is a block diagram showing a functional configuration of the apparatus at the time of signature.

FIG. 2 is a block diagram showing a functional configuration of the apparatus 100 at the time of signature. The apparatus 100 includes a binary-tree creating unit 201 and a digital-signature processing unit 202. To the binary-tree creating unit 201, streaming data ST such as a moving image and audio data being disclosure data is input. Moreover, in a random number mode, the binary-tree creating unit 201 accepts a request to create a root random number $r_R$. In the random number mode, a hash value is calculated using a random number.

When the streaming data ST is input, the binary-tree creating unit 201 creates a hash-value binary tree in which a tree structure is formed using hash values as nodes, and outputs a root hash value $h_R$ to be the root thereof to the digital-signature processing unit 202. Moreover, when the request to create the root random number $r_R$ is received, the binary-tree creating unit 201 creates a random-number binary tree in which a tree structure is formed using random numbers as nodes, and outputs the root random number $r_R$ to be the root thereof as disclosure information.

The digital-signature processing unit 202 creates a digital signature $S_A$ of a signer using the root hash value that is output from the binary-tree creating unit 201. Creation of the digital signature by the digital-signature processing unit 202 is performed by a conventional digital signature technique.

Figure 3:
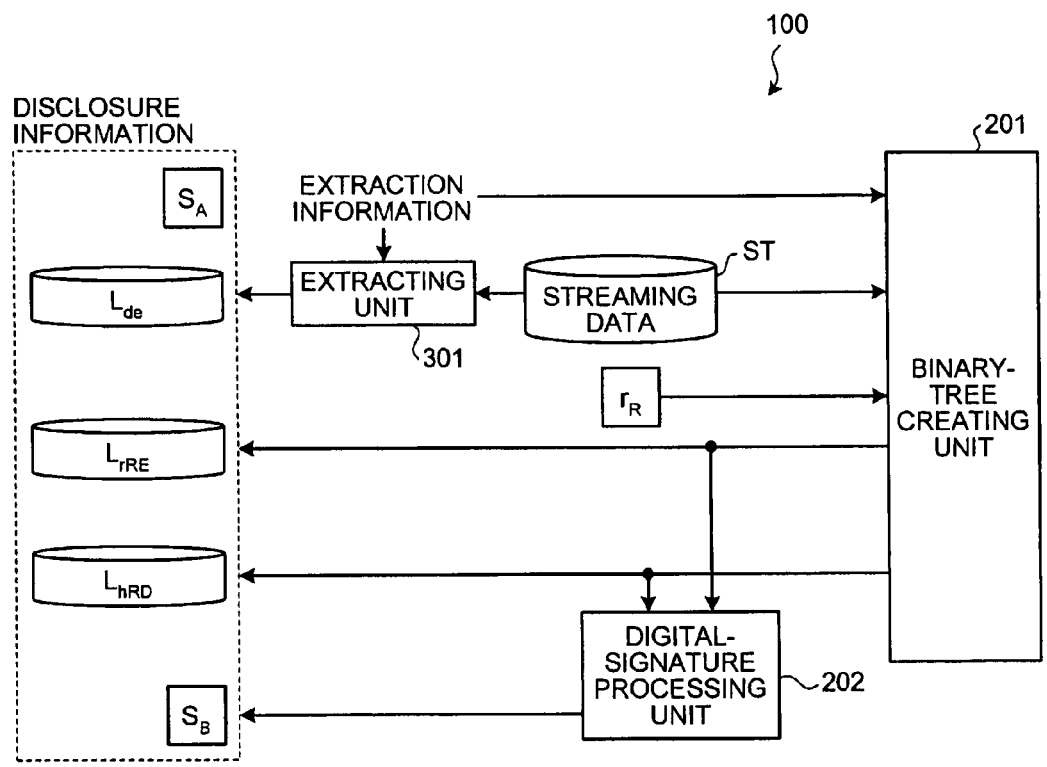
FIG. 3 is a block diagram showing a functional configuration of the apparatus at the time of extraction.

FIG. 3 is a block diagram showing a functional configuration of the apparatus 100 at the time of extraction. The apparatus 100 includes an extracting unit 301, the binary-tree creating unit 201, and the digital-signature processing unit 202. The extracting unit 301 receives extraction information. The extraction information indicates a range of the streaming data ST an extractor is to extract therefrom.

Upon receiving the extraction information, the extracting unit 301 extracts a data string (hereinafter, "extraction data string $L_{de}$") corresponding to the range indicated by the extraction information. The extraction data string $L_{de}$ is constituted of one or more of sequential partial data (hereinafter "extraction data"), and is output as disclosure information. In the case of the anonymous extraction, this extraction data string $L_{de}$ and the digital signature $S_A$ of the signer are output as the disclosure information.

The binary-tree creating unit 201, upon receiving the extraction information, outputs a root hash value string $L_{hRD}$ to verify the extraction data string $L_{de}$ as disclosure information. In the random number mode, upon receiving the root random number $r_R$ obtained at the time of signature, the binary-tree creating unit 201 outputs a root random number string $L_{rRE}$ corresponding to the extraction data string $L_{de}$ as the disclosure information.

In the case of the onymous extraction, the digital-signature processing unit 202 creates a digital signature $S_B$ of the extractor using the hash-value binary tree created by the binary-tree creating unit 201. In the random number mode, the digital-signature processing unit 202 creates the digital signature $S_B$ of the extractor further using a random-number binary tree. In the case of the onymous extraction, the created digital signature $S_B$ of the extractor is output as the disclosure information together with the extraction data string $L_{de}$ and the digital signature $S_A$.

Figure 4:
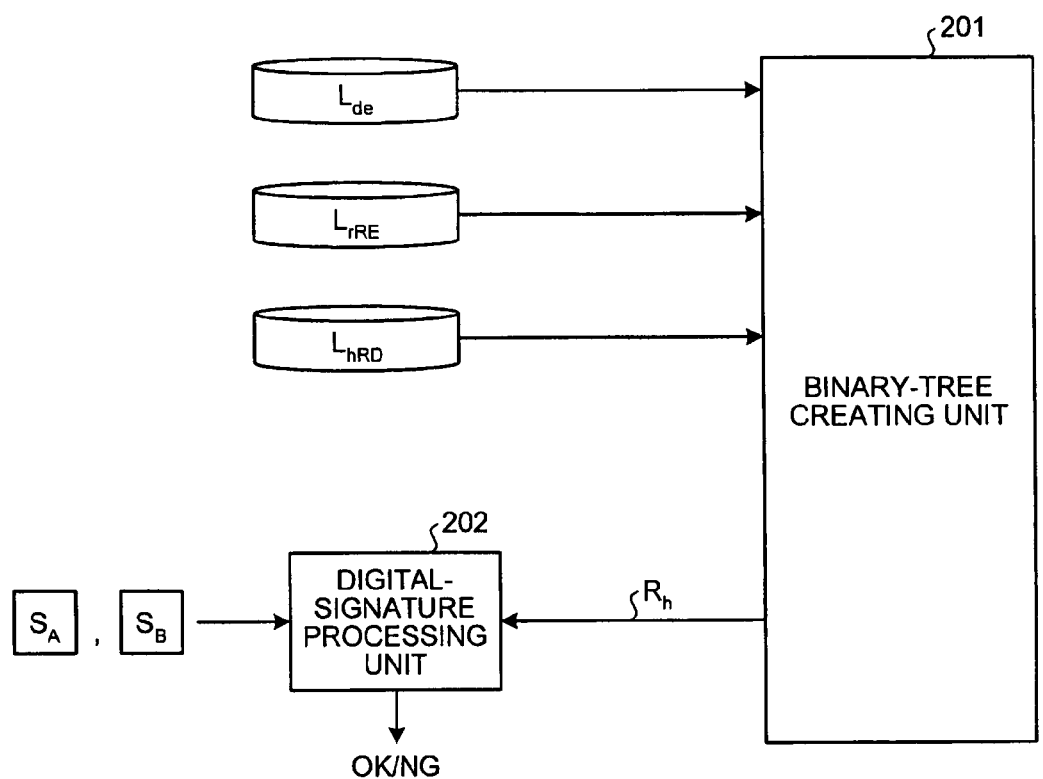
FIG. 4 is a block diagram showing a functional configuration of the apparatus at the time of verification.

FIG. 4 is a block diagram showing a functional configuration of the apparatus 100 at the time of verification. The apparatus 100 includes the binary-tree creating unit 201 and the digital-signature processing unit 202. The binary-tree creating unit 201 receives the extraction data string $L_{de}$ and the root hash value string $L_{hRD}$, creates a hash-value binary tree, and outputs the root hash value string $L_{hRD}$ of the hash-value binary tree to the digital-signature processing unit 202. In the random number mode, the binary-tree creating unit 201 receives the root random value string $Lr_{RE}$, to create a random-number binary tree. The binary-tree creating unit 201 then creates (restores) a hash-value binary tree using leaves being random numbers corresponding to respective extraction data of the extraction data string $L_{de}$.

In the case of the anonymous extraction, the digital-signature processing unit 202 receives the digital signature $S_A$ of the signer, and verifies validity of the digital signature $S_A$ based on the root hash value of the restored hash-value binary tree. In the case of the onymous extraction, the digital-signature processing unit 202 further receives the digital signature $S_B$ of the extractor, and verifies validity of the digital signature $S_B$ based on the root random number string $L_{rRE}$ and the root hash value string $L_{hRD}$. Verification (confirmation) of a digital signature by the digital-signature processing unit 202 is performed by a conventional digital signature technique.

The function of the binary-tree creating unit 201 varies in each of cases of signature, extraction, and verification. Therefore, the function is explained for each case.

Figure 5:
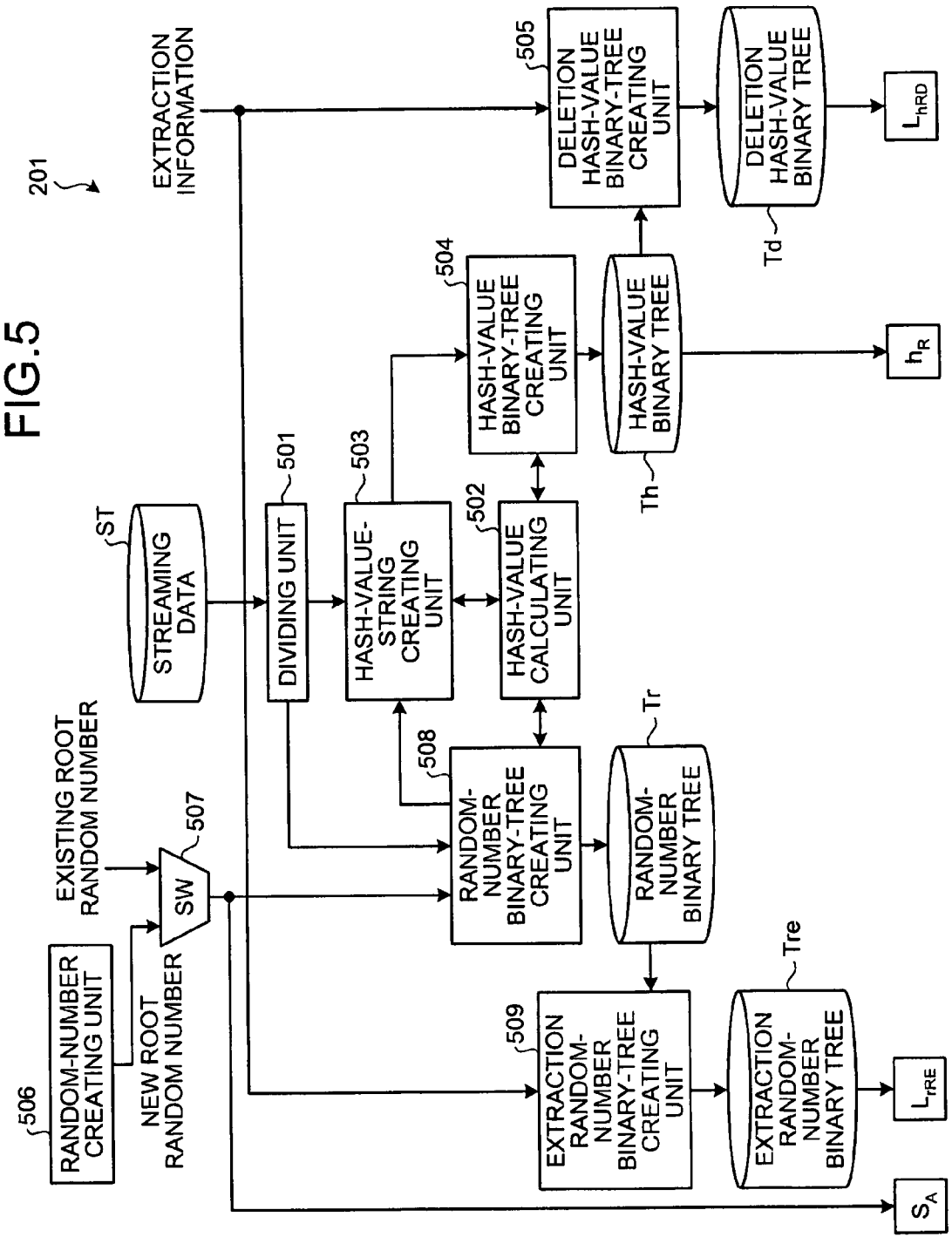
FIG. 5 is a block diagram of a functional configuration of a binary-tree creating unit at the time of signature and extraction.

FIG. 5 is a block diagram of a functional configuration of the binary-tree creating unit 201 at the time of signature and extraction. The binary-tree creating unit 201 creates various kinds of binary trees such as a hash-value binary tree Th and a random-number binary tree Tr of the streaming data ST.

The binary-tree creating unit 201 includes a dividing unit 501, a hash-value calculating unit 502, a hash-value-string creating unit 503, a hash-value binary-tree creating unit 504, a deletion hash-value binary-tree creating unit 505, a random-number creating unit 506, a switch 507, a random-number binary-tree creating unit 508, and an extraction random-number binary-tree creating unit 509.

Upon receiving the streaming data ST, the dividing unit 501 divides the streaming data ST into partial data in a predetermined unit. A set of the partial data is to be a partial data string. The unit of division can be arbitrarily determined. For example, when the streaming data ST is in MPEG-1, the streaming data ST can be divided in an image unit or in a GOP unit.

When a numeric value is input, the hash-value calculating unit 502 calculates a hash value by applying the numeric value to a hash value function, and returns the hash value to a source of the numeric value. In the present embodiment, a hash function is used as an example of a one-way function. However, it is not limited to the hash function as long as the function is a one-way function.

The hash-value-string creating unit 503 creates a hash value string constituted of hash values of the respective partial data, which is a unit of division, in cooperation with the hash-value calculating unit 502. Specifically, the partial data is digitalized by a conventional digital signature technique to be provided to the hash-value calculating unit 502. By receiving a hash value that is calculated by the hash-value calculating unit 502, the hash-value-string creating unit 503 creates a hash value string. The number of hash values of the hash value string to be created is n.

When a hash value of partial data $d_i$ is $h_i$, and a hash parameter of the partial data $d_i$ to be created by a conventional digital signature technique is $e_i$, the hash value $h_i$ of the partial data $d_i$ is expressed by Equation (1) below.

$$h_i = H(e_i) \quad (1)$$

H( ) is a hash function. Furthermore, when it is assumed that a random number $r_i$ is provided for the partial data $d_i$, the hash value $h_i$ of the partial data $d_i$ is expressed by Equation (2) below.

$$h_i = H(e_i \| r_i) \quad (2)$$

x∥y indicates connection of the end of a numeric value x and the head of a numeric value y. For example, when x=123 and y=456, x∥y=123456.

The hash-value binary-tree creating unit 504 creates the hash-value binary tree Th having the hash value string created by the hash-value-string creating unit 503 as a leaf group, in cooperation with the hash-value calculating unit 502. The number of leaves is the same as the number of hash values n.

In the hash-value binary tree Th, nodes (including leaves and roots) are hierarchically structured. Specifically, when the hash values indicating nodes at branch destinations at a low level are $h_a$ and $h_b$, the hash value $h_{a,b}$ of a node at a root of the branch is expressed by Equation (3) below.

$$h_{a,b} = H(h_a \| h_b) \quad (3)$$

The hash-value binary-tree creating unit 504 provides the hash values $h_a$ and $h_b$ expressing the nodes at the branch destinations at a low level to the hash-value calculating unit 502. The hash-value calculating unit 502 calculates the hash value $h_{a,b}$ and sends the hash value ha,b to the binary-tree creating unit 201. The hash values $h_a$ and $h_b$ are hash values expressing adjacent nodes in the same level. In the present embodiment, a suffix of a hash value is positional information to identify a position of the hash value in a binary tree. When extraction or restoration is performed, this positional information is to be a clue.

Figure 6:
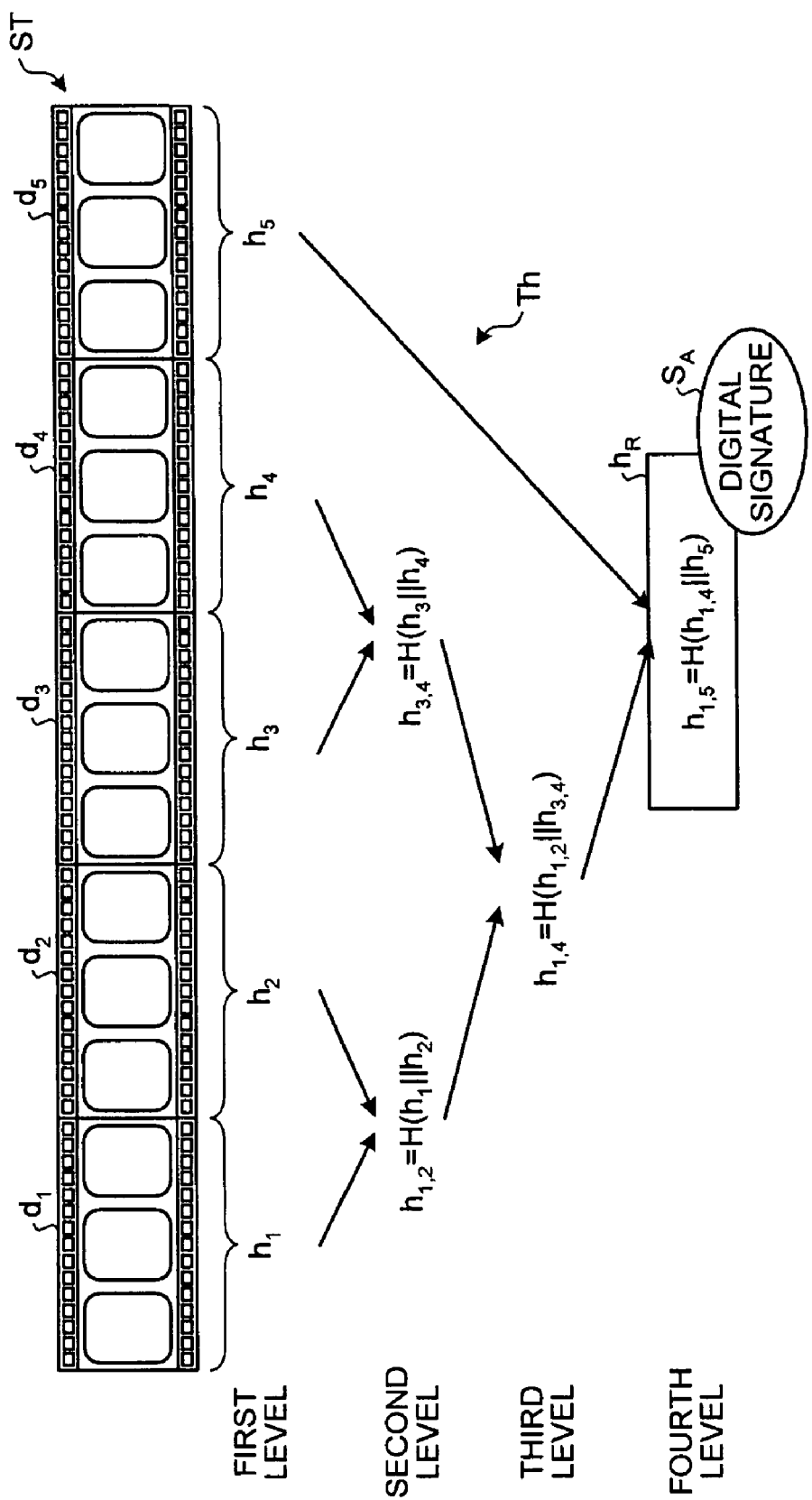
FIG. 6 is a schematic diagram of a hash-value binary tree that is created when the number of partial data n is an odd number (n=5)

In the hash-value binary-tree creating unit 504, a creating method varies depending on the number of partial data n, specifically, depending on whether the number of leaves n is an odd number or an even number. FIG. 6 is a schematic diagram of the hash-value binary tree Th that is created when the number of partial data n is an odd number (n=5).

Respective partial data $d_1$ to $d_5$ shown in FIG. 6 are data obtained by dividing the streaming data ST in GOP units by the dividing unit 501. Hash values $h_1$ to $h_5$ correspond to the partial data $d_1$ to $d_5$, respectively, and is created as a hash value string $\{h_1, h_2, h_3, h_4, h_5\}$ by the hash-value-string creating unit 503. This hash value string $\{h_1, h_2, h_3, h_4, h_5\}$ becomes a leaf group of the hash-value binary tree Th.

The hash-value binary-tree creating unit 504 pairs adjacent hash values from the hash value at the top. A pair cannot be made with a hash value belonging to another pair. In the example shown in FIG. 6, the hash values $h_1$ and $h_2$ are paired, and the hash values $h_3$ and $h_4$ are paired. The hash values $h_2$ and $h_3$ cannot be paired. Since the number of partial data n is an odd number, the hash value $h_5$ is left alone.

When the hash values at the first level are leaves, hash values in the second level are to be a root of the branch in a higher level, and are created using Equation (3) above. A hash value $h_{1,2}$ to be the root of the hash values $h_1$ and $h_2$ and a hash value $h_{3,4}$ to be the root of the hash values $h_3$ and $h_4$ are created by Equation (3). A hash value $h_{1,4}$ in the third level is also created similarly using the hash values $h_{1,2}$ and $h_{3,4}$ by Equation (3) above.

Since a hash value indicating a node of a branch destination is only the hash value $h_{1,4}$, a hash value $h_{1,5}$ that expresses a branch root node is created from the hash value $h_{1,4}$ and the hash value h₅ that is left alone at the leaf by Equation (3). A root (hash value) $h_R$ is extracted from this hash-value binary tree Th and is output to the digital-signature processing unit 202. Thus, the digital signature $S_A$ of the signer is created.

A case where the number of partial data n is an even number (n=4) corresponds to a case in which the partial data h₅ is not present in the example shown in FIG. 6. Specifically, the hash value string to be the leaf group is {h₁, h₂, h₃, h₄}, and therefore, the hash value $h_{1,4}$ is to be the root hash value $h_R$. The root (hash value) $h_R$ is extracted from this hash-value binary tree Th, and is output to the digital-signature processing unit 202. Thus, the digital signature $S_A$ of the signer is created.

Figure 7:
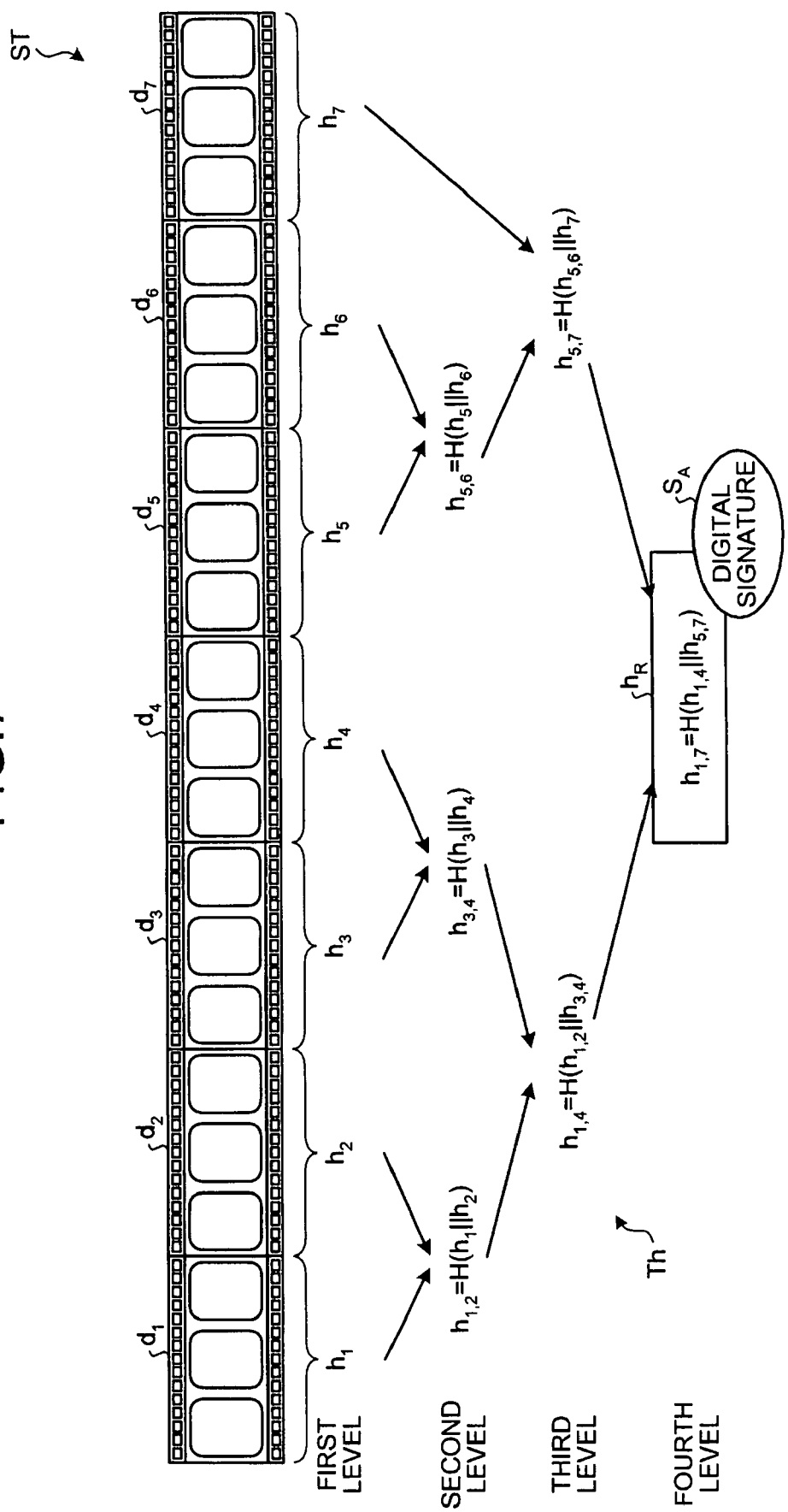
FIG. 7 is a schematic diagram of a hash-value binary tree that is created when the number of partial data n is an odd number (n=7)

FIG. 7 is a schematic diagram of the hash-value binary tree Th that is created when the number of partial data n is an odd number (n=7). In the second level, the number of hash values is an odd number (three). In this case, the hash values $h_{1,2}$ and $h_{3,4}$ are paired, and the hash value $h_{5,6}$ is also left alone besides the hash value h₇ in the first level. Therefore, in the third level, from the hash values $h_{5,6}$ and h₇ left alone, a hash value $h_{5,7}$ to be a branch root node is created using Equation (3).

Finally, in the fourth level, from the hash value $h_{1,4}$ and $h_{5,7}$, a hash value $h_{1,7}$ to be a branch root node is created by Equation (3). The hash value $h_{1,7}$ is to be the root (hash value) $h_R$. The root (hash value) $h_R$ is extracted from this hash-value binary tree Th, and is output to the digital-signature processing unit 202. Thus, the digital signature $S_A$ of the signer is created.

A case where the number of partial data n is an even number (n=6) corresponds to a case in which the partial data d₇ is not present in the example shown in FIG. 7. Specifically, the hash value string to be the leaf group is {h₁, h₂, h₃, h₄, h₅, h₆}, the hash value h₇ of a leaf is not present, and the hash value $h_{5,7}$ in the third level is not created.

Therefore, by connecting the hash value $h_{5,6}$ left alone in the second level with the hash value $h_{1,4}$ in the third level, a hash value $h_{1,6}$ to be a branch root node is created using Equation 3. This hash value $h_{1,6}$ is to be the root hash value $h_R$. The root (hash value) $h_R$ is extracted from this hash-value binary tree Th, and is output to the digital-signature processing unit 202. Thus, the digital signature $S_A$ of the signer is created.

As described, an amount of data to be created at the time of signature can be reduced to an amount of data of the digital signature $S_A$ of a signer, independent of a reproduction time of the streaming data ST since a hash value set is not used as in the conventional technique.

The deletion hash-value binary-tree creating unit 505 shown in FIG. 5 functions at the time of extraction, and creates a binary tree (hereinafter, "deletion hash-value binary tree Td") having only hash values of deletion data in the streaming data ST as leaves. The deletion data corresponds to partial data other than the extraction data in the streaming data ST.

The deletion hash-value binary-tree creating unit 505 extracts a root hash value string $L_{hRD}$ to be a root of the deletion hash-value binary tree Td, and outputs as disclosure information. When the number of extraction data is c, the upper limit of the maximum value of the number of the root hash value $h_R$ included in the root hash value string $L_{hRD}$ is $2 \cdot \log_2 \{(n/c)/2\}$.

Figure 8:
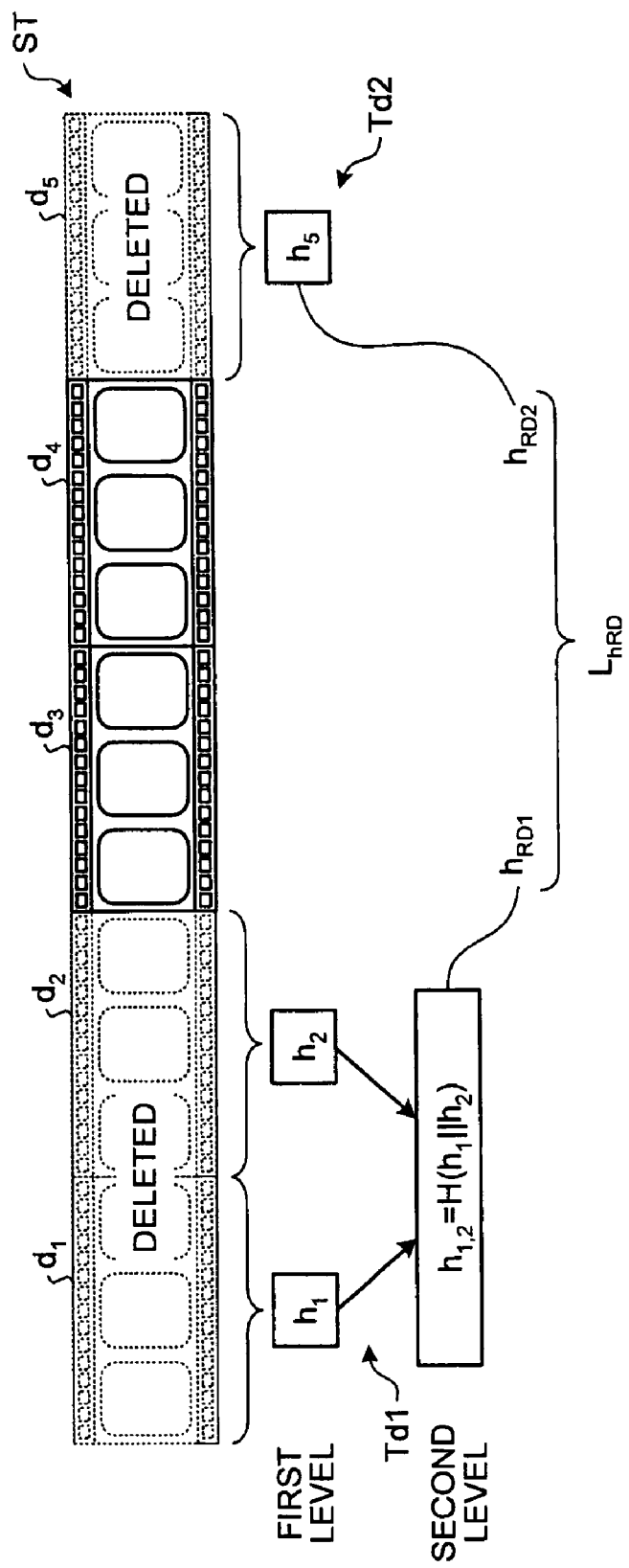
FIG. 8 is a schematic diagram for explaining creation of a deletion hash-value binary tree.

FIG. 8 is a schematic diagram for explaining creation of a deletion hash-value binary tree Td. The example shown in FIG. 8 is explained using the streaming data ST shown in FIG. 5. When the deletion hash-value binary tree Td is created, leaves of the extraction data is not used and only leaves of the deletion data are used. First, in the first level, hash values h₁, h₂, and h₅ expressing the leaves are selected.

Next, in the second level, similarly to the hash-value binary-tree creating unit 504, the deletion hash-value binary-tree creating unit 505 performs a binary tree process in cooperation with the hash-value calculating unit 502. Specifically, the hash value $h_{1,2}$ to be a branch root node of the hash values h₁ and h₂ is created by Equation (3).

The hash value $h_{1,2}$ in the second level stands alone since a hash value to be connected therewith is originally not present, and is not changed any further to a hash value in a higher level. Thus, a root hash-value binary tree Td1 having the hash values h₁ and h₂ as leaves and the hash value $h_{1,2}$ as a root hash value $h_{RD1}$ is created.

Furthermore, the hash value h₅ also stands alone, and the hash value h₅ is not changed any further to a hash value in a higher level. Therefore, a root hash-value binary tree Td2 constituted of only the hash value h₅ is created. In other words, in the root hash value binary tree Td2, the hash value h₅ is to be a root hash value $h_{RD2}$. A root hash value string $L_{hRD}$ constituted of the root hash values $h_{1,2}$ and h₅ is output as disclosure information.

The random-number creating unit 506 shown in FIG. 5 is structured with a conventional random number generator, and creates a random number. The switch 507 selects a random number from an existing random number and a random number newly created by the random-number creating unit 506. The selected random number is output to the random-number binary-tree creating unit 508 and the extraction random-number binary-tree creating unit 509 as the root random number $r_R$. The root random number $r_R$ itself is also output as disclosure information. The root random number $r_R$ is a random number that is positioned at a root in the random-number binary tree Tr described later. The root random number $r_R$ can be obtained by the random-number creating unit 506 and the switch 507.

Moreover, the random-number binary-tree creating unit 508 creates the random-number binary tree Tr in cooperation with the hash-value calculating unit 502. The random number to be used is required to have a property that another random number cannot be estimated from a subset of the random number to be used. Therefore, the random-number binary tree Tr is created using the hash function from the root random number $r_R$ to a leaf random number inversely to the reduction of an amount of data of hash values.

While the hash-value binary tree Th is not a complete binary tree, in the random number creation, a complete binary tree having random numbers exceeding required number of random numbers is created. In the present embodiment, a suffix of a random number is positional information to identify a position of the random number in a binary tree. When extraction or restoration is performed, this positional information is to be a clue.

The random-number binary-tree creating unit 508 calculates random numbers to be leaves (leaf random number) using the root random number $r_R$ output from the switch 507 as an origin to create the random-number binary tree Tr that is hierarchically structured. The number of leaf random numbers coincides with the number of partial data n.

Creation of the random-number binary tree Tr is explained herein. Suppose a random number to be a branch root of hash values expressing two nodes of branch destinations is $r_{i,j}$. Two random numbers expressing the nodes at the branch destinations are expressed by Equations (4) and (5) below.

$$r_{i,\lfloor(i+j)/2\rfloor} = H(r_{i,j} \| L) \qquad (4)$$

$\lfloor a \rfloor$ means that fractions after the decimal point are rounded off.

(Example) $\lfloor 3.6 \rfloor = 3$

L represents a numeric string to be an origin in creating one of the branch destination random numbers $r_{i,\lfloor (i+j)/2 \rfloor}$.

$$r_{\lceil (i+j)/2 \rceil, j} = H(r_{i,j} \| R) \quad (5)$$

$\lceil a \rceil$ means that fractions after the decimal point are rounded up.

(Example) $\lceil 3.6 \rceil = 4$

R represents a numeric string to be an origin in creating the other one of the branch destination random numbers $r_{\lceil (i+j)/2 \rceil, j}$, and $L \ne R$.

When the random-number binary tree Tr is created, the root random number $r_R$ is $r_{i,j}$. When $r_{i,j} = r_R$, i coincides with an ascending number of partial data at the top (i=1).

On the other hand, j is calculated from the number of partial data n. Specifically, it is expressed by Equation (6) below.

$$j = 2^{\lceil Log2(n) \rceil} \quad (6)$$

When a following condition A is satisfied, one of the branch destination random number expressed in Equation (4) is to be a leaf random number $r_j$.

<Condition A>

When $\lfloor (i+j)/2 \rfloor = i$ in Equation (4), one of the branch destination random numbers $r_{i,\lfloor (i+j)/2 \rfloor}$ is to be a leaf random number $r_i$.

Furthermore, when a following condition B is satisfied, the other one of the branch destination random number expressed in Equation 5 is to be the leaf random number $r_j$.

<Condition B>

When $\lceil (i+j)/2 \rceil = j$ in Equation (5), the other one of the branch destination random numbers $r_{\lceil (i+j)/2 \rceil, j}$ is to be a leaf random number $r_j$.

Moreover, when the branch destination random number $r_{\lceil (i+j)/2 \rceil, j}$ is $\lceil (i+j)/2 \rceil > n$, the branch destination random number $r_{\lceil (i+j)/2 \rceil, j}$ is not created.

Figure 9:
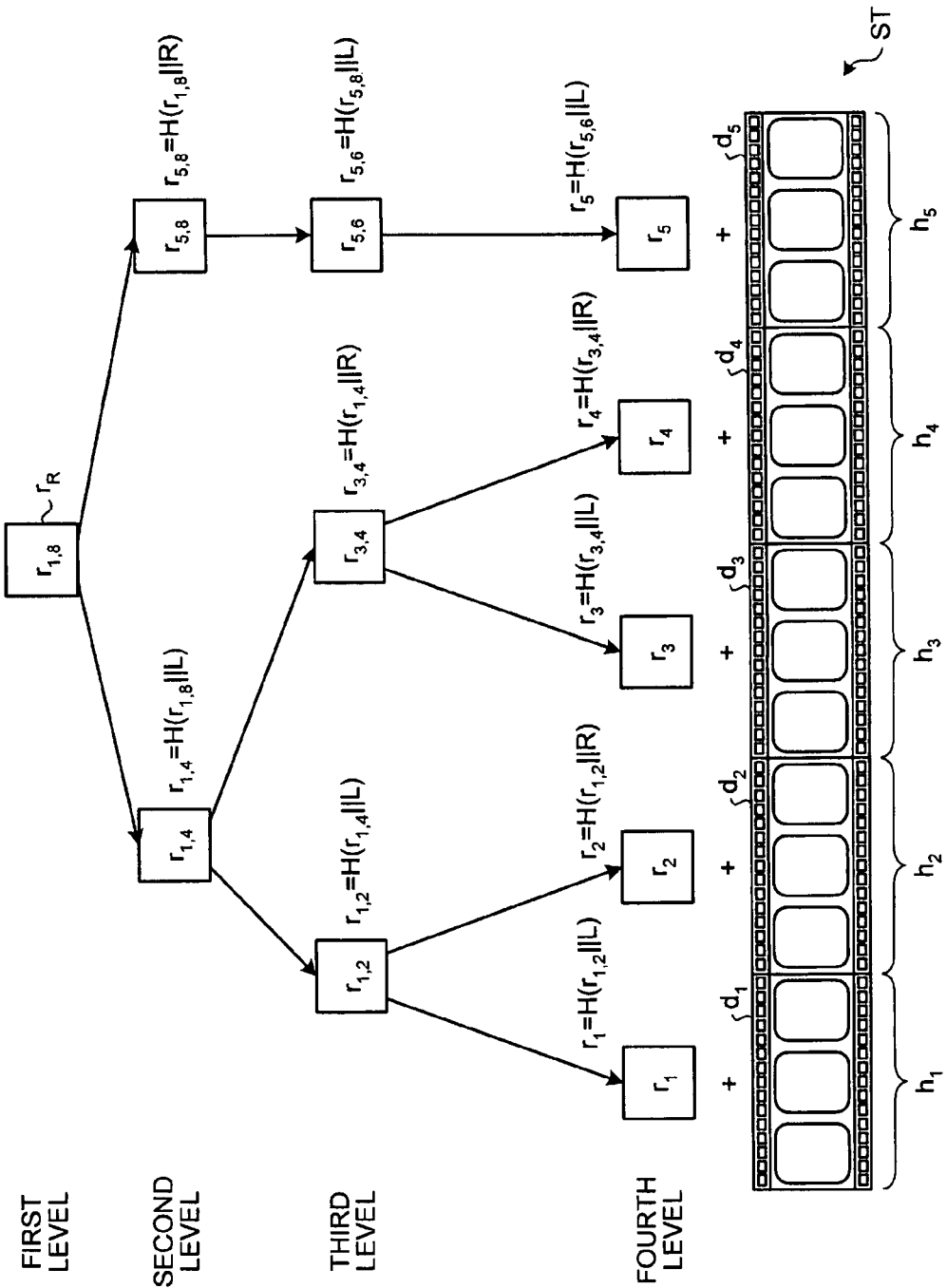
FIG. 9 is a schematic diagram of a random-number binary tree Tr that is created when the number of partial data n=5.

A case where the number of partial data n=5 is explained. FIG. 9 is a schematic diagram of the random-number binary tree Tr that is created when the number of partial data n=5. Explanation is given using the streaming data ST shown in FIG. 5. As shown in FIG. 9, j is expressed as Equation (7) below, and the root random number $r_R = r_{1,8}$ is set in the first level.

$$j = 2^{\lceil Log2(5) \rceil} = 2^{\lceil 2.32193 \ldots \rceil} = 2^3 = 8 \quad (7)$$

Next, in the second level, two branch destination random numbers $r_{1,4}$ and $r_{5,8}$ whose branch root random number $r_R = r_{1,8}$ are created. In the third level, two branch destination random numbers $r_{1,2}$ and $r_{3,4}$ whose branch root random number is the random number $r_{1,4}$ are created. As for the random number $r_{5,8}$, since the random number $r_{5,8}$ corresponds to $r_{i,j} = r_{n,n+3}$, only a random number $r_{5,6}$ to be one of the branch destination random numbers is created.

Thereafter, in the fourth level, two branch destination random numbers $r_{1,1} = r_1$ and $r_{2,2} = r_2$ whose branch root random number is the random number $r_{1,2}$ are created. Similarly for the random number $r_{3,4}$, two branch destination random numbers $r_{3,3} = r_3$ and $r_{4,4} = r_4$ whose branch root random number is the random number $r_{3,4}$ are created.

As for the random number $r_{5,6}$, since the random number $r_{5,6}$ corresponds to $r_{i,j} = r_{n,n+1}$, only a random number $r_{5,5} = r_5$ to be one of the branch destination random numbers $r_i$, $(_{(i+j)/2})$ is created. Thus, only with the root random number $r_R$, all other random numbers can be created. Thereafter, by using Equation (2), the hash-value-string creating unit 503 can create the hash value $h_i$ considering the random number $r_i$ for each of the partial data $d_i$.

A case where the number of partial data n=4 corresponds to a case in which the partial data $d_5$ is not present in the example shown in FIG. 9. Specifically, the root random number $r_R$ is the random number $r_{1,4}$, and the random numbers $r_{1,8}$, $r_{5,6}$, and $r_5$ are not created.

Figure 10:
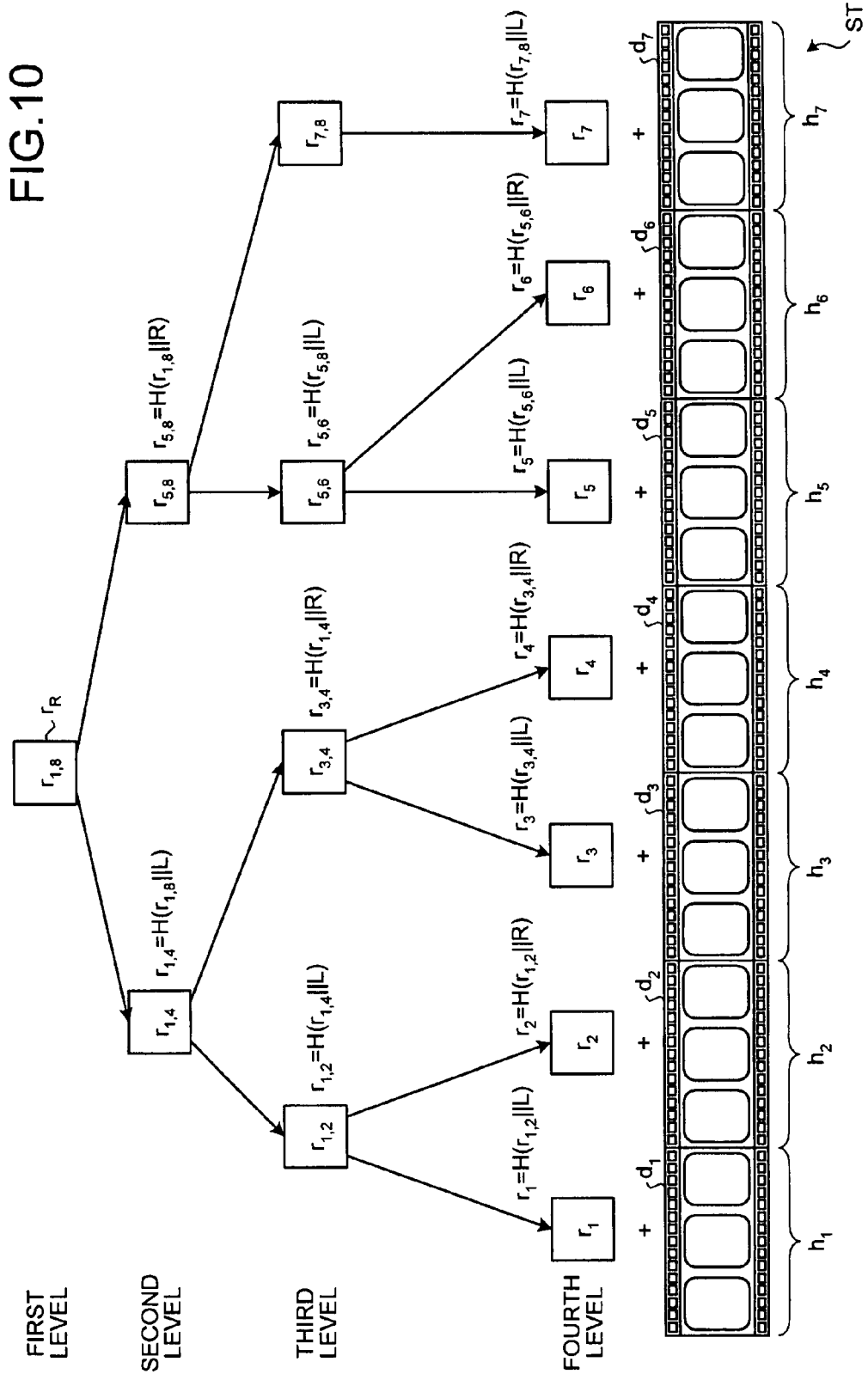
FIG. 10 is a schematic diagram of a random-number binary tree Tr that is created when the number of partial data n=7.

A case where the number of partial data n=7 is explained. FIG. 10 is a schematic diagram of the random-number binary tree Tr that is created when the number of partial data n=7. Explanation is given using the streaming data ST shown in FIG. 5. Only parts different from the example shown in FIG. 9 are explained.

In the third level, two branch destination random numbers $r_{5,6}$ and $r_{7,8}$ whose branch root random number is $r_{5,8}$ are created. In the fourth level, two branch destination random numbers $r_{5,5} = r_5$ and $r_{6,6} = r_6$ whose branch root random number is $r_{5,6}$ are created. As for the random number $r_{7,8}$, since one of the branch destination random numbers is expressed as in Equation (8), for the other one of the branch destination random numbers, only a random number $r_{7,7} = r_7$ is created as Equation (9) below.

In one of the branch destination random numbers $$r_{\lceil (i+j)/2 \rceil, j}, \lceil (i+j)/2 \rceil = 8 > 7 \quad (8)$$

random number $r_{7,7} = r_7$ to be the other one of the branch destination random numbers $$r_{i, \lfloor (i+j)/2 \rfloor} \quad (9)$$

Thus, only with the root random number $r_R$, all other random numbers can be created. Thereafter, by using Equation (2), the hash-value-string creating unit 503 can create the hash value $h_i$ considering the random number $r_i$ for each of the partial data $d_i$.

A case where the number of partial data n=6 is same as a case in which the partial data $d_7$ is not present in the example shown in FIG. 10. Specifically, since the random numbers $r_{7,8}$ is not created from the random number $r_{5,8}$, the random number $r_7$ is not created.

The extraction random-number binary-tree creating unit 509 shown in FIG. 5 functions at the time of extraction, and creates a random-number binary tree Tr (hereinafter, "extraction random-number binary tree Tre") having only random numbers corresponding to the extraction data as leaves in the random-number binary trees Tr. The extraction random-number binary-tree creating unit 509 outputs a rood random number string $L_{rRE}$ that is constituted of only a root random number $r_{RE}$ of the extraction random-number binary tree Tre as disclosure information.

Figure 11:
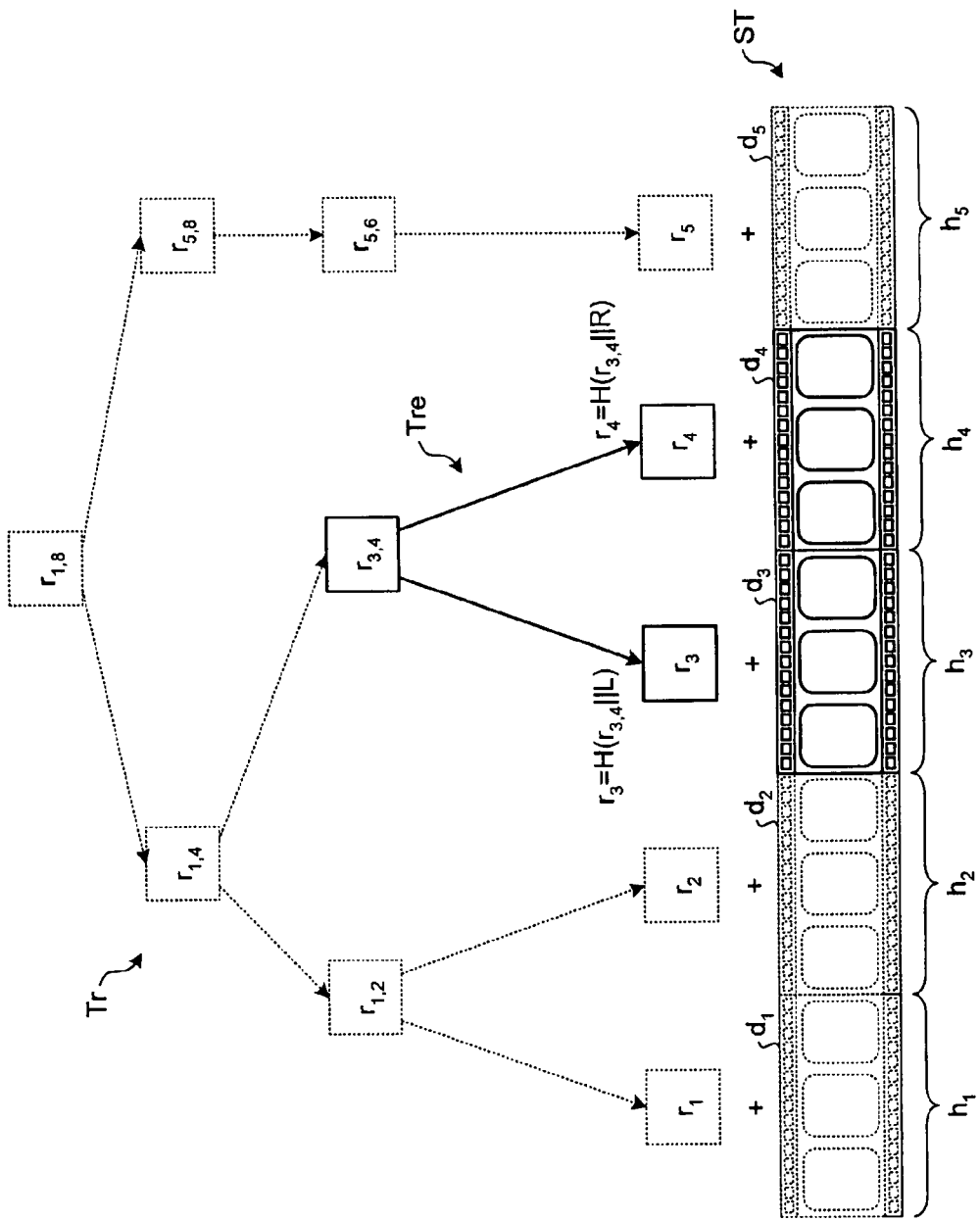
FIG. 11 is a schematic diagram for explaining creation of an extraction random-number binary tree.

FIG. 11 is a schematic diagram for explaining creation of the extraction random-number binary tree Tre. Explanation is given using the streaming data ST shown in FIG. 5. In the example shown in FIG. 11, leaf random numbers corresponding to the extraction data $d_3$ and $d_4$ are the random numbers $r_3$ and $r_4$. Therefore, a random-number binary tree Tr whose leaves are only the random numbers $r_3$ and r4 and the root random number $r_R$ is $r_{3,4}$ is extracted from the random-number binary tree Tr. Only with this root random number $r_{RE}$, the leaf random number $r_3$ and $r_4$ required for the extraction data $d_3$ and $d_4$ can be created even without a random-number binary tree Tr larger than that.

Figure 12:
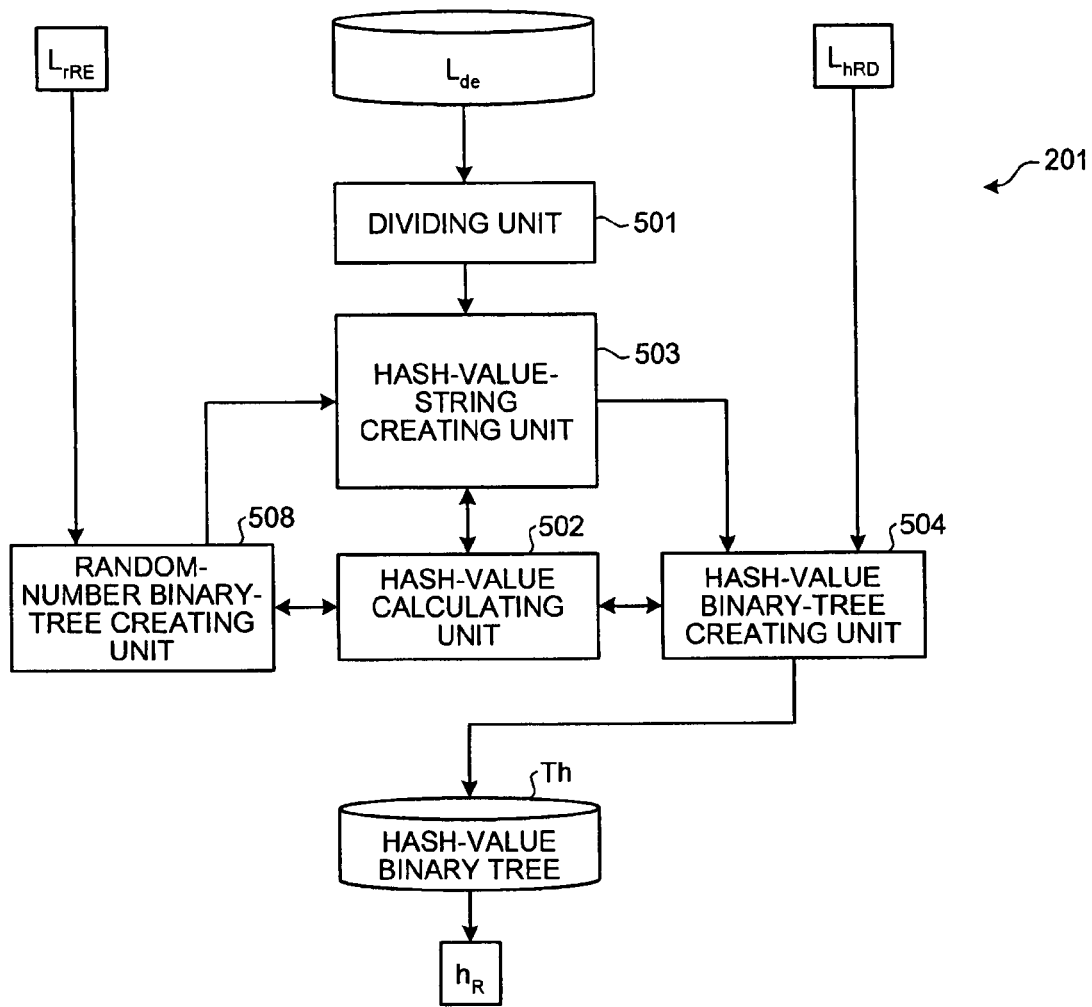
FIG. 12 is a block diagram of a functional configuration of the binary-tree creating unit at the time of verification.

FIG. 12 is a block diagram of a functional configuration of the binary-tree creating unit 201 at the time of verification. The dividing unit 501 functions in the same manner as at the time of signature and extraction shown in FIG. 5. Specifically, when the extraction data string $L_{de}$ is input, the dividing unit 501 divides the extraction data string $L_{de}$ into partial data in a predetermined unit. The unit of division is the same as that in the case of signature and extraction. The hash-value calculating unit 502 calculates a hash value, when a numeric value is input, by applying the numeric value to the hash function, and returns the hash value to a source of the numeric value.

The hash-value-string creating unit 503 creates a hash value string constituted of hash values of the respective partial data, which is a unit of division, in cooperation with the hash-value calculating unit 502. Specifically, the partial data is digitalized by a conventional digital signature technique to be provided to the hash-value calculating unit 502. By receiving a hash value that is calculated by the hash-value calculating unit 502, the hash-value-string creating unit 503 creates a hash value string. A specific method of creating a hash value is same as that described in FIG. 5.

The random-number binary-tree creating unit 508 obtains the root random number string $L_{rRE}$ of the extraction random-number binary tree Tre by the same method as that described in FIG. 5, and creates the random-number binary tree Tr. Since a root random number structuring the root random number string $L_{rRE}$ is usually just one, this root random number is used as an origin to create the random-number binary tree Tr. A leaf random number string of the created random-number binary tree Tr is output to the hash-value-string creating unit 503.

The hash-value binary-tree creating unit 504 restores the hash-value binary tree Th of the streaming data ST in cooperation with the hash-value calculating unit 502. Specifically, the hash-value binary-tree creating unit 504 restores the original hash-value binary tree Th using the hash value string created by the hash-value-string creating unit 503 and the root hash value string $L_{RD}$ of the deletion hash-value binary tree Td being the disclosure information.

Figure 13:
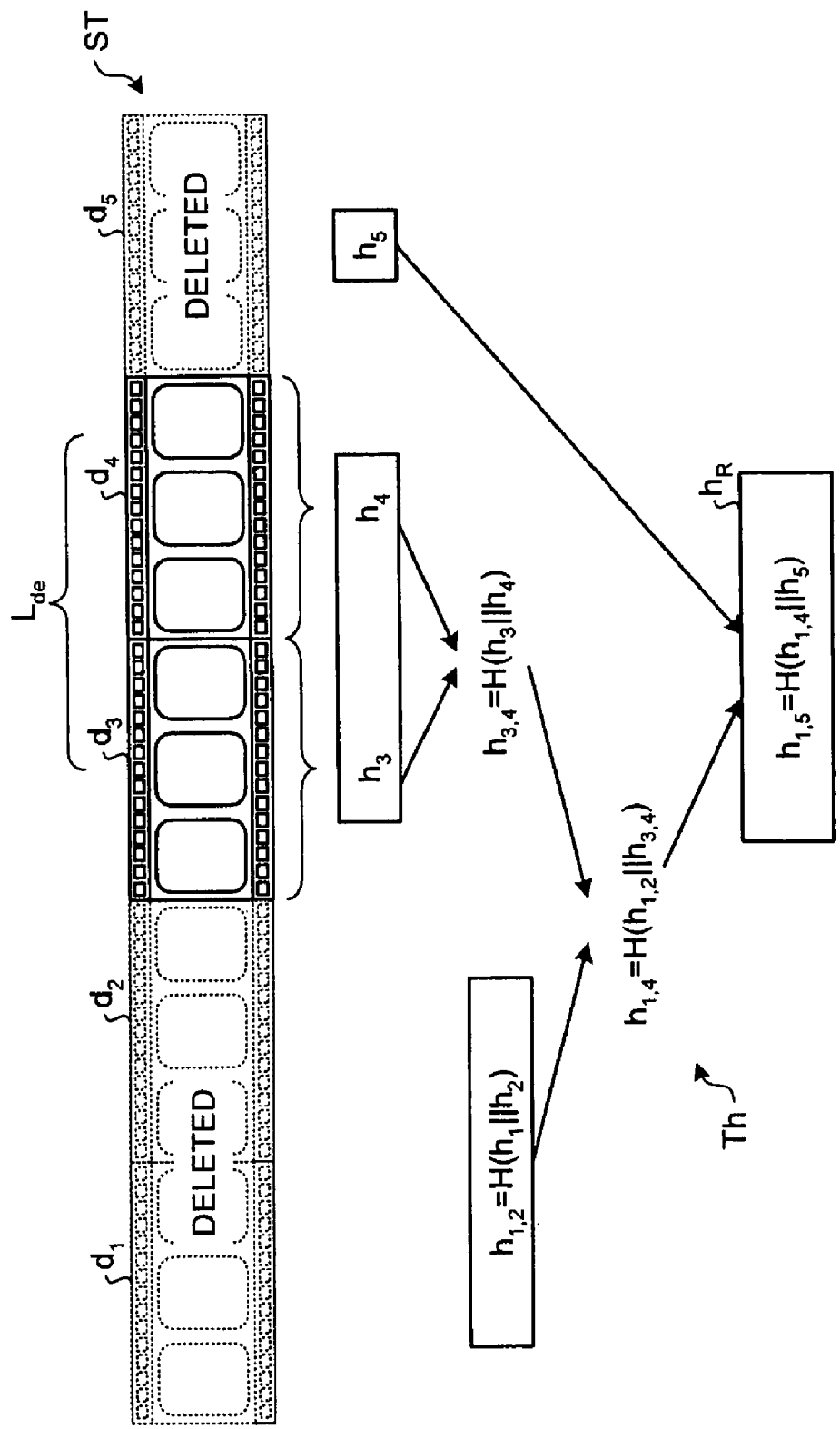
FIG. 13 is a schematic diagram showing restoration of a hash-value binary tree Th.

FIG. 13 is a schematic diagram showing restoration of the hash-value binary tree Th. Explanation is given using the streaming data ST shown in FIG. 5. As shown in FIG. 13, when the hash-value binary tree Th is to be restored, the hash values $h_3$ and $h_4$ of the respective extraction data $d_3$ and $d_4$ constituting the extraction data string $L_{de}$ are created. From the hash values $h_3$ and $h_4$, the hash value $h_{3,4}$ can be created.

Furthermore, the root hash values $h_{1,2}$ and $h_5$ constituting the root hash value string $L_{hRD}$ of the deletion hash-value binary tree Td being the disclosure information at the time of extraction are obtained. The root hash value $h_{1,2}$ is a hash value obtained by combining the hash values $h_1$ and $h_2$ of the partial data $d_1$ and $d_2$ that are deleted from the streaming data ST.

Therefore, the root hash value $h_{1,2}$ can be combined with the hash values $h_3$ and $h_4$ obtained by calculation, and the hash value $h_{1,4}$ can be created. Further by combining the root hash value $h_5$ standing alone and the hash value $h_{1,4}$, the hash value $h_{1,5}$ can be created. This hash value $h_{1,5}$ is to be the root hash value $h_R$. Thus, the original hash-value binary tree Th can be restored.

Figure 14:
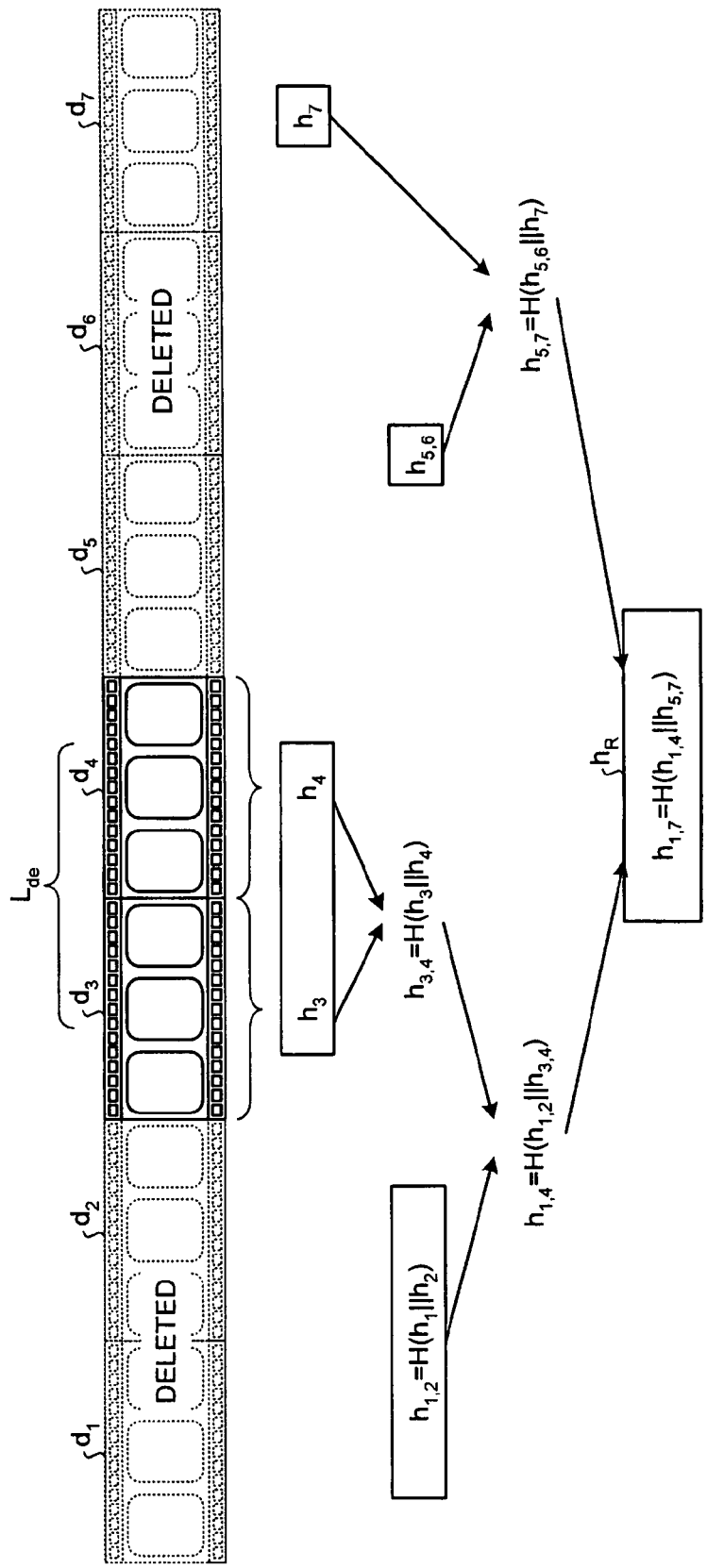
FIG. 14 is a schematic diagram showing restoration of the hash-value binary tree Th.

FIG. 14 is another schematic diagram showing restoration of the hash-value binary tree Th. Explanation is given using the streaming data ST shown in FIG. 7. As shown in FIG. 14, when the hash-value binary tree Th is to be restored, the hash values $h_3$ and $h_4$ of the respective extraction data constituting the extraction data string $L_{de}$ are created. From the hash values $h_3$ and $h_4$, the hash value $h_{3,4}$ can be created.

Furthermore, the root hash values $h_{1,2}$, $h_{5,6}$ and $h_7$ constituting the root hash value string $L_{hRD}$ of the deletion hash-value binary tree Td being the disclosure information at the time of extraction are obtained. The root hash value $h_{1,2}$ is a hash value obtained by combining the hash values $h_1$ and $h_2$ of the partial data $d_1$ and $d_2$ that are deleted from the streaming data ST. Therefore, the root hash value $h_{1,2}$ can be combined with the hash values $h_3$ and $h_4$ obtained by calculation, and the hash value $h_{1,4}$ can be created.

Moreover, the root hash value $h_{5,6}$ is a hash value obtained by combining the hash values $h_5$ and $h_6$ of the partial data $d_5$ and $d_6$ that are deleted from the streaming data ST. Therefore, by combining the root hash value $h_{5,6}$ with the hash value $h_7$ standing alone, the hash value $h_{5,7}$ can be created.

Thereafter, by combining the hash value $h_{1,4}$ and the hash value $h_{5,7}$ at the same level, the hash value $h_{1,7}$ can be created. This hash value $h_{1,7}$ is to be the root hash value $h_R$. Thus, the original hash-value binary tree Th can be restored.

Figure 15:
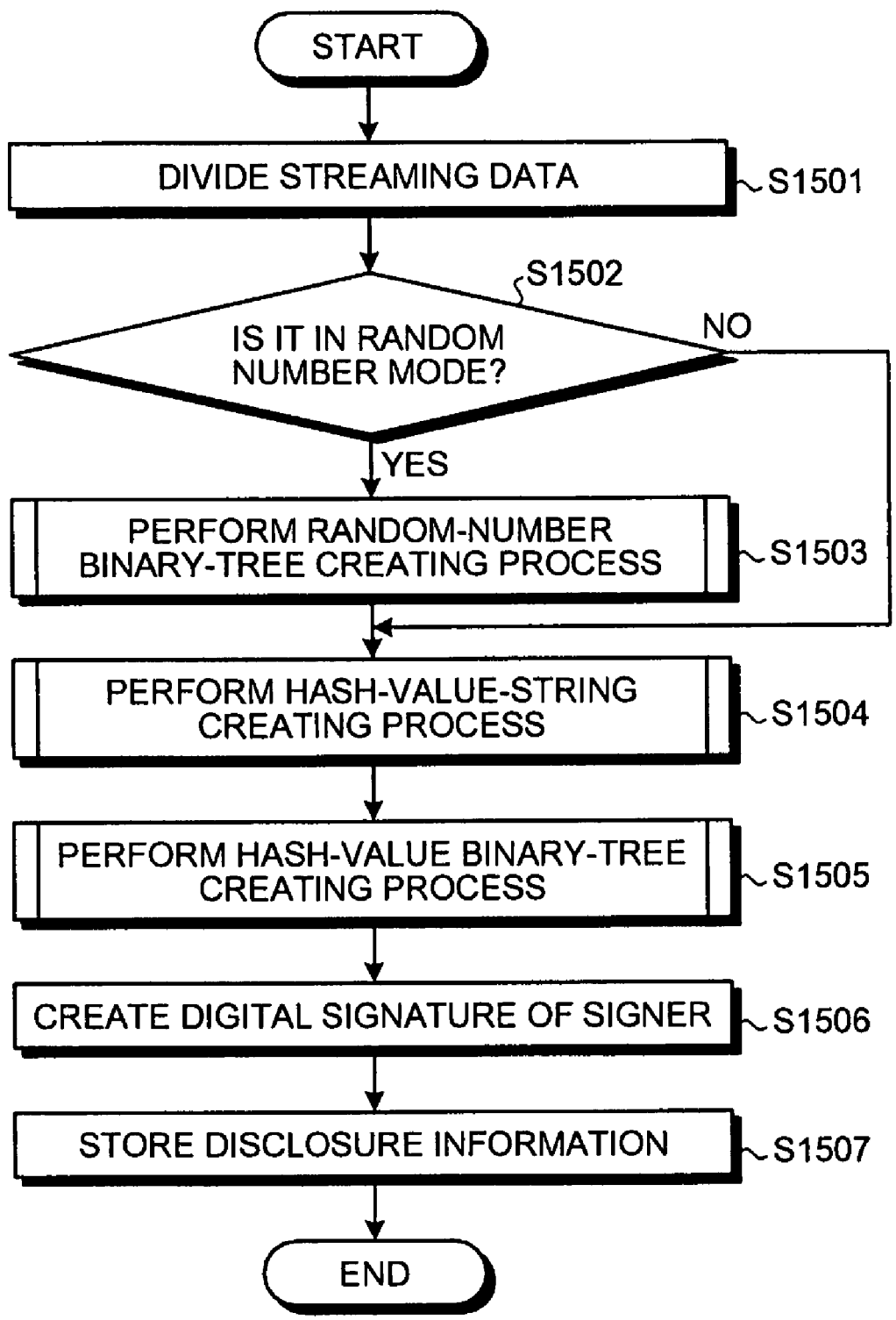
FIG. 15 is a flowchart of a signature process performed by the apparatus.

FIG. 15 is a flowchart of a signature process performed by the apparatus 100. First, the dividing unit 501 reads the streaming data ST and divides the streaming data ST by a predetermined unit of division (for example, GOP) (step S1501).

The apparatus 100 then determines whether it is in the random number mode (step S1502). When it is in the random number mode (step S1502: YES), the random-number binary-tree creating process is performed by the random-number binary-tree creating unit 508 (step S1503). On the other hand, when it is not in the random number mode (step S1502: NO), the process proceeds to step S1504.

Subsequently, a hash-value-string creating process is performed by the hash-value-string creating unit 503 (step S1504). The hash-value binary-tree creating unit 504 then creates the hash-value binary tree Th (step S1505).

Thereafter, the digital-signature processing unit 202 creates the digital signature $S_A$ of a signer using the root hash value $h_R$ of the hash-value binary tree Th (step S1506). Subsequently, the disclosure information such as the digital signature $S_A$ of the signer and the root random number $r_R$ created as necessary is stored (step S1507).

Figure 16:
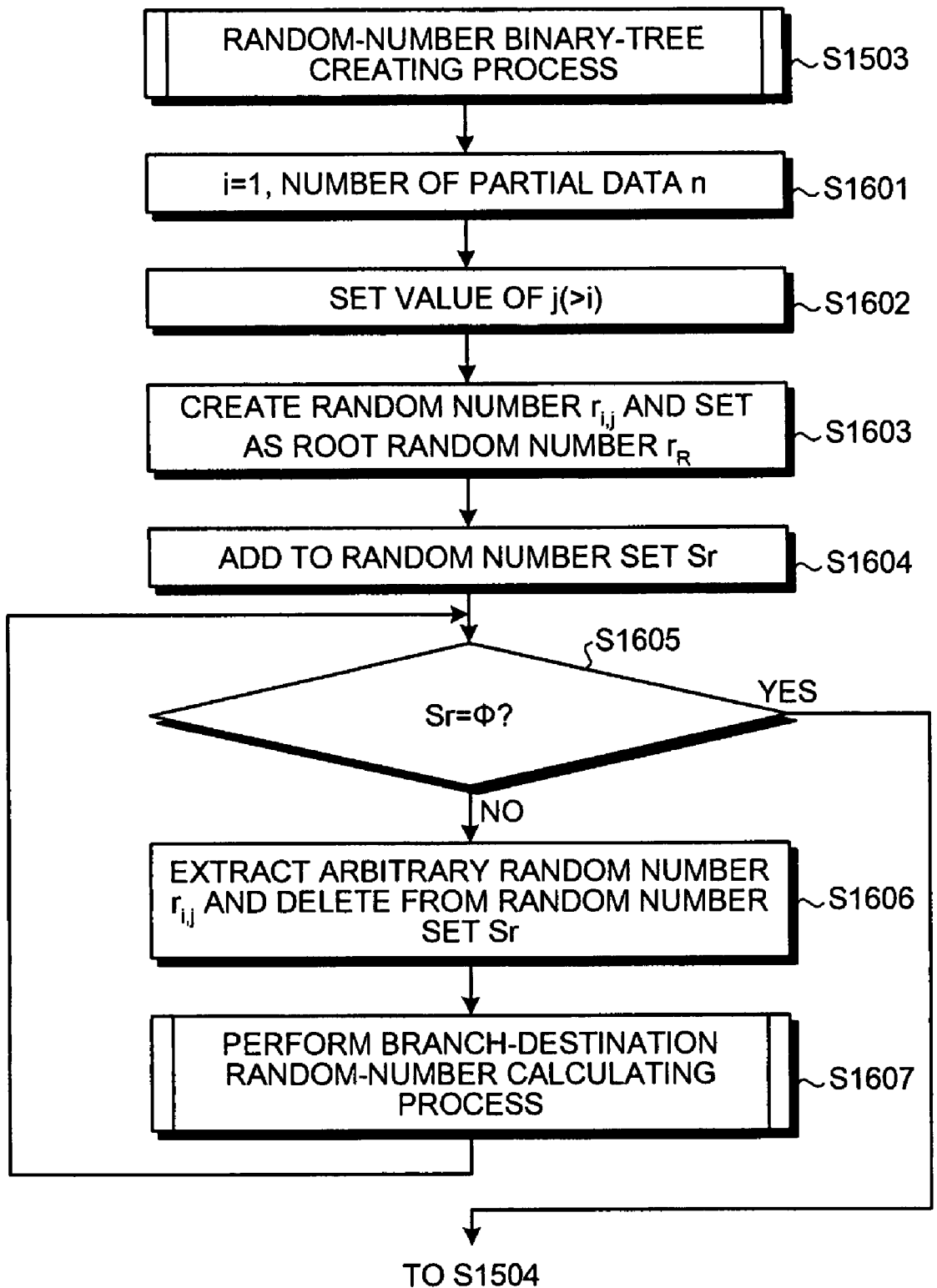
FIG. 16 is a flowchart of a random-number binary-tree creating process (step S1503) shown in FIG. 15.

FIG. 16 is a flowchart of the random-number binary-tree creating process (step S1503) shown in FIG. 15. As shown in FIG. 16, when an index i=1, and the number of partial data is n (step S1601), from the number of partial data n, a value of an index j is set (step S1602). The value of j is set based on Equations (5) to (8) described above.

The random-number creating unit 506 creates a random number $r_{i,j}$ to be set to the root random number $r_R$ (step S1603). Thereafter, this root random number $r_R$ is added to a random number set Sr (step S1604).

Subsequently, it is determined whether the random number set Sr is an empty set (Sr=Φ) (step S1605). When Sr≠Φ (step S1605: NO), an arbitrary random number $r_{i,j}$ is extracted from the random number set Sr and deleted from the random number set Sr (step S1606). A branch-destination random-number calculating process is then performed (step S1607), and the process returns to step S1605. On the other hand, when Sr=Φ (step S1605: YES), the process proceeds to the hash-value-string creating process (step S1504).

Figure 17:
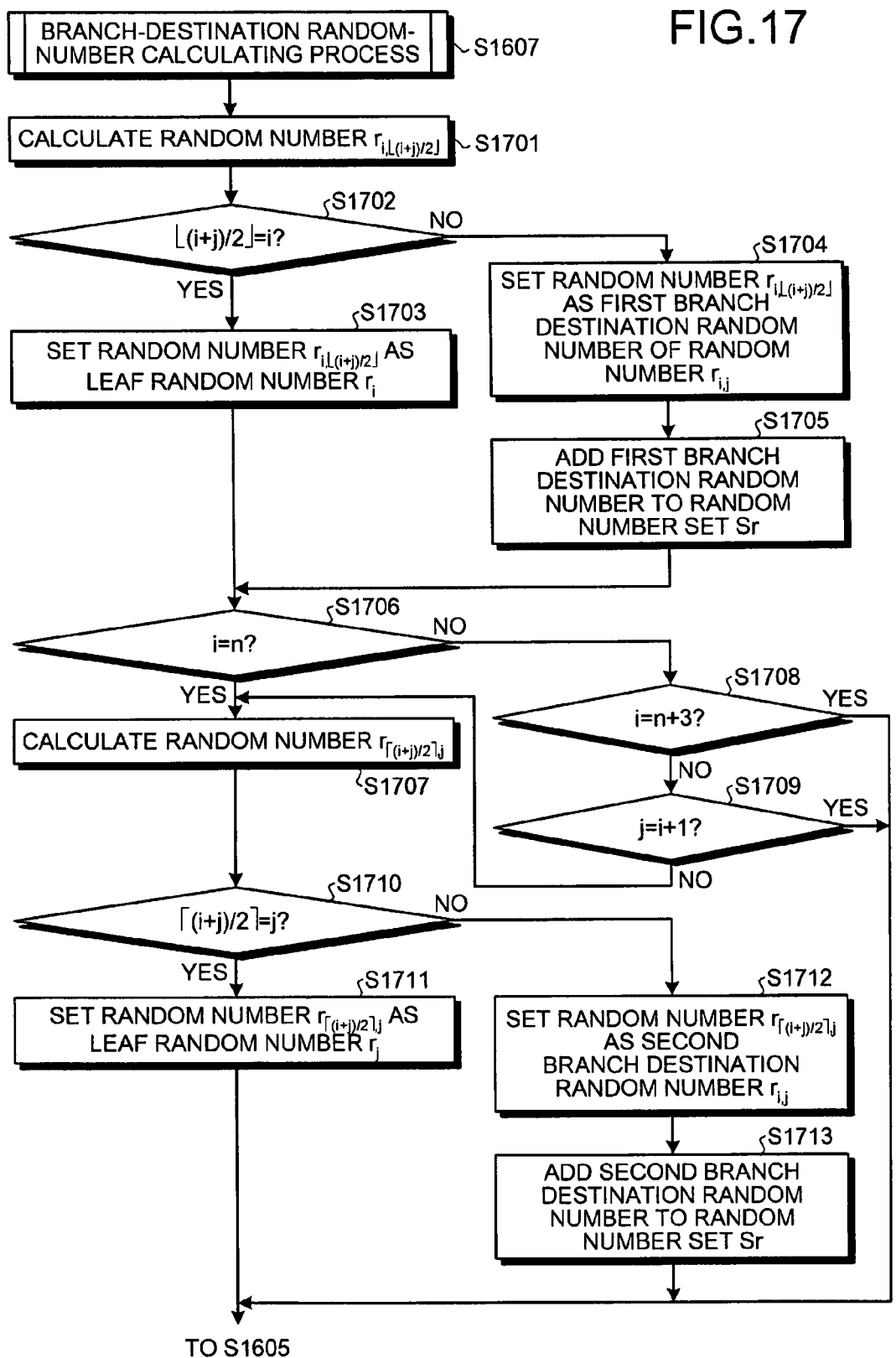
FIG. 17 is a flowchart of a branch-destination random-number calculating process (step S1607) shown in FIG. 16.

FIG. 17 is a flowchart of the branch-destination random-number calculating process (step S1607) shown in FIG. 16. A random number (see Equation (10) below) corresponding to the random number $r_{i,j}$ is calculated as expressed in Equation (4) above (step S1701).

$$r_{i, \lfloor (i+j)/2 \rfloor} \tag{10}$$

It is then determined whether Equation (11) below is satisfied (step S1702).

$$\lfloor (i+j)/2 \rfloor = i \tag{11}$$

When Equation (11) is satisfied (step S1702: YES), the random number of Equation (10) is set to a leaf random number $r_i$ (step S1703), and the process proceeds to step S1706.

On the other hand, when Equation (11) is not satisfied (step S1702: NO), the random number of Equation (10) is set to a first branch destination random number of the random number $r_{i,j}$ (step S1704). This first branch destination random number is added to the random number set Sr (step S1705), and the process proceeds to step S1706.

It is determined whether i=n (step S1706). When it is i=n (step S1706: YES), as shown in Equation (5) above, a random number (see Equation (12) below) corresponding to the random number $r_{i,j}$ is calculated (step S1707). On the other hand, when it is not i=n (step S1706: NO), it is determined whether i=n+3 (step S1708).

$$r_{\lceil(i+j)/2\rceil,j} \qquad (12)$$

When it is i=n+3 (step S1708: YES), the process proceeds to step S1605. For example, when the random number $r_{i,j}$ is the random number $r_{5,8}$ shown in FIG. 9, the random number $r_{7,8}$ is not to be created as in this process. On the other hand, when it is not i=n+3 (step S1708: NO), it is determined whether j=i+1 (step S1709).

When it is j=i+1 (step S1709: YES), the process proceeds to step S1605. For example, when the random number $r_{i,j}$ is the random number $r_{5,6}$ shown in FIG. 9, the random number $r_{6,6}$ is not to be created as in this process. On the other hand, when it is not j=i+1 (step S1709: NO), the process proceeds to step S1707.

Following step S1707, it is determined whether Equation (13) below is satisfied (step S1710).

$$\lceil(i+j)/2\rceil = j \qquad (13)$$

When Equation (13) is satisfied (step S1710: YES), the random number expressed in Equation (12) is set to the leaf random number $r_j$ (step S1711).

On the other hand, when Equation (13) is not satisfied (step S1710: NO), the random number expressed in Equation (12) is set to a second branch destination random number of the random number $r_{i,j}$ (step S1712). This second branch destination random number is added to the random number set Sr (step S1713), and the process proceeds to step S1605.

Figure 18:
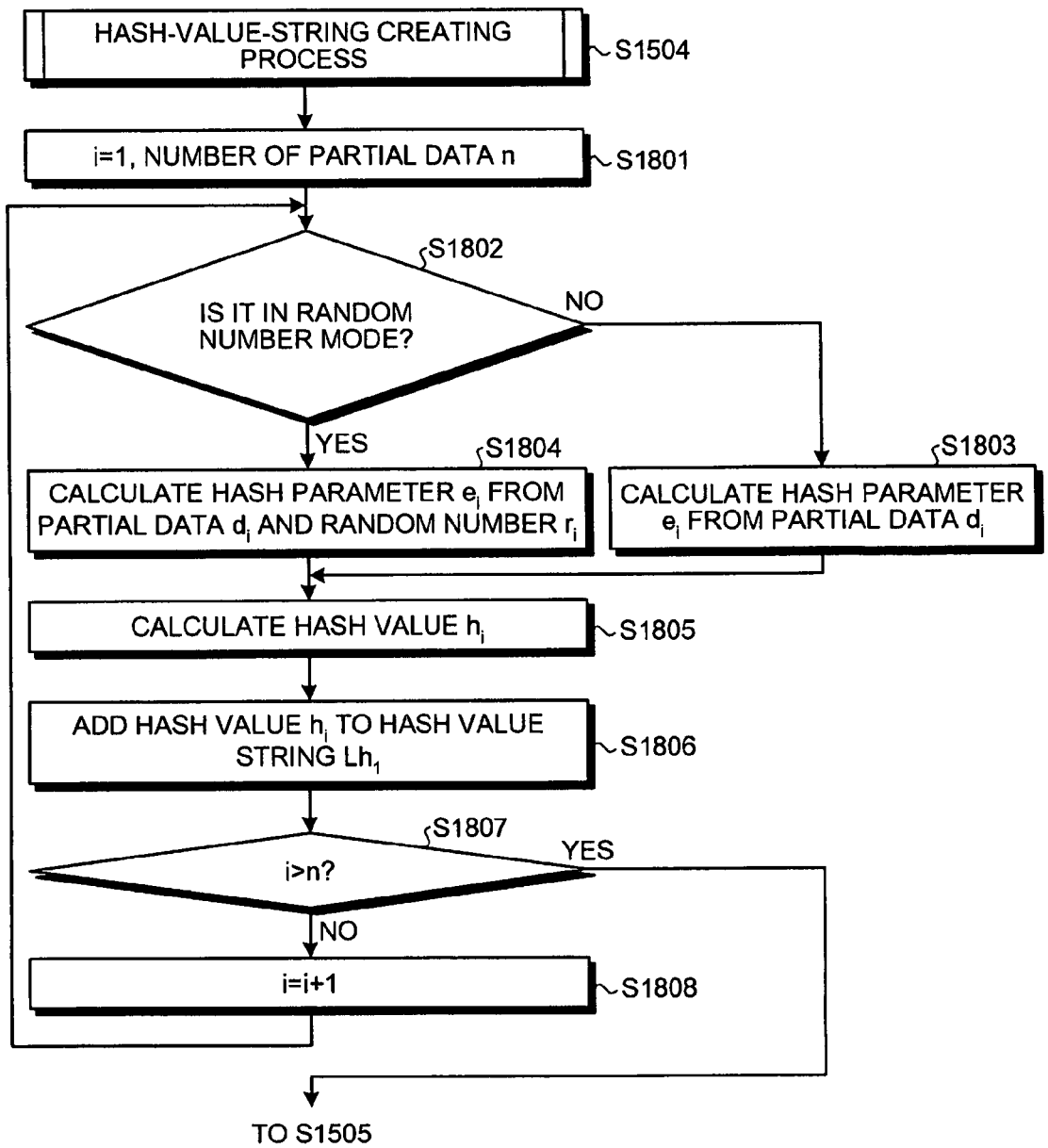
FIG. 18 is a flowchart of a hash-value-string creating process (step S1504) shown in FIG. 15.

FIG. 18 is a flowchart of the hash-value-string creating process (step S1504) shown in FIG. 15. When the index i=1 and the number of partial data is n (step S1801), whether it is in the random number mode is determined (step S1802). When it is not in the random number mode (step S1802: NO), a hash parameter $e_i$ of the partial data $d_i$ is calculated from Equation (1) (step S1803). On the other hand, when it is in the random number mode (step S1802: YES), the hash parameter $e_i$ is calculated from the partial data $d_i$ and the random number $r_i$ by Equation (2) (step S1804).

By applying the hash parameter $e_i$ to the hash function H( ), the hash value $h_i$ is calculated (step S1805). The hash value $h_i$ is added to the hash value string $Lh_1$ (step S1806).

Thereafter, it is determined whether i>n (step S1807). When it is not i>n (step S1807: NO), i is incremented by 1 (step S1808), and the process returns to step S1802. On the other hand, when i>n (step S1807: YES), the process proceeds to step S1505.

Figure 19:
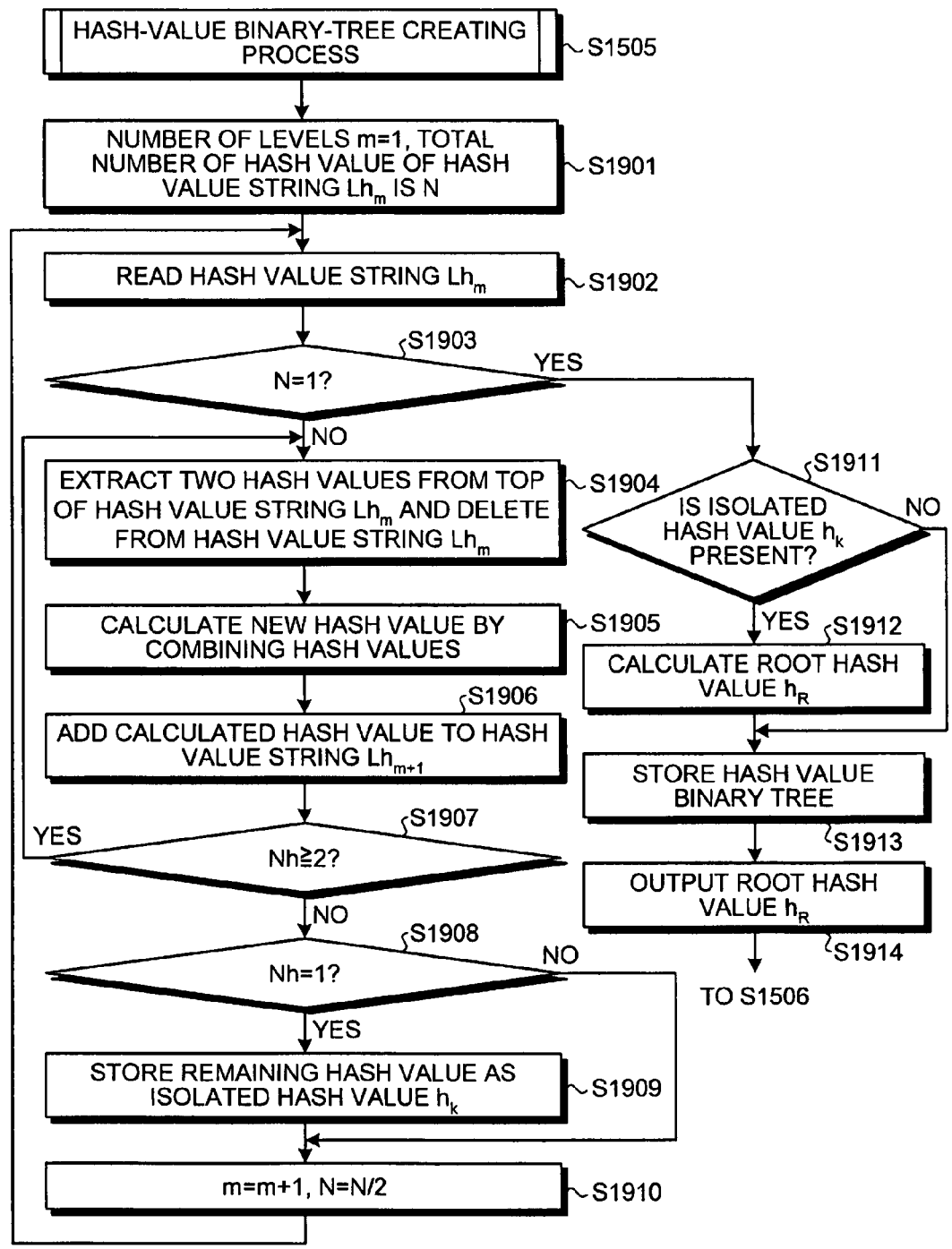
FIG. 19 is a flowchart of a hash-value string creating process (step S1505) shown in FIG. 15.

FIG. 19 is a flowchart of the hash-value binary-tree creating process (step S1505) shown in FIG. 15. The number of levels indicating the hierarchy of the hash-value binary tree Th to be created is m=1, and the total number of hash values included in the hash value string $Lh_m$ is N (step S1901). The hash value string $Lh_m$ of the number of levels m=1 is a hash value string that is created by the hash-value-string creating process.

Subsequently, the hash value string $Lh_m$ is read (step S1902), and it is determined whether N=1 (step S1903).

When it is not N=1 (step S1903: NO), two hash values are extracted from the top of the hash value string $Lh_m$ and deleted from the hash value string $Lh_m$ (step S1904).

As shown in Equation (3), the extracted two hash values are combined and applied to the hash function H( ) as a hash parameter. Thus, a new hash value is calculated (step S1905). The calculated hash value is added to the hash value string $Lh_{m+1}$ in the next level (step S1906).

Subsequently, it is determined whether the remaining number Nh of hash values in the hash value string $Lh_m$ is Nh≧2 (step S1907). When it is Nh≧2 (step S1907: YES), the process returns to step S1904. On the other hand, when it is not Nh≧2 (step S1907: NO), it is then determined whether Nh=1 (step S1908).

When it is Nh=1 (step S1908: YES), a remaining hash value in the hash value string $Lh_m$ is stored in a memory as an isolated hash value $h_k$ (step S1909), and the process proceeds to step S1910.

On the other hand, when it is not Nh=1 (step S1908: NO), the number of levels m is incremented by 1, and the total number of hash values N of the hash value string $Lh_m$ in the next level is reduced to half (N/2) (step S1910). Then, the process returns to step S1902.

When it is N=1 (step S1903: YES), it is determined whether the isolated hash value $h_k$ is present (step S1911). When the isolated hash value $h_k$ is present (step S1911: YES), the root hash value $h_R$ is calculated as shown in FIGS. 6 and 7 using the single hash value in the hash value string $Lh_m$ and the isolated hash value (step S1912). On the other hand, when the isolated hash value $h_k$ is not present (step S1911: NO), since the hash-value binary tree Th is already completed, the process proceeds to step S1913.

Thus, the hash-value binary tree Th is created. Thereafter, the hash-value binary tree Th is stored in a memory (step S1913), and the root hash value $h_R$ is output to the digital-signature processing unit 202 (step S1914), and the process proceeds to step S1506.

Figure 20:
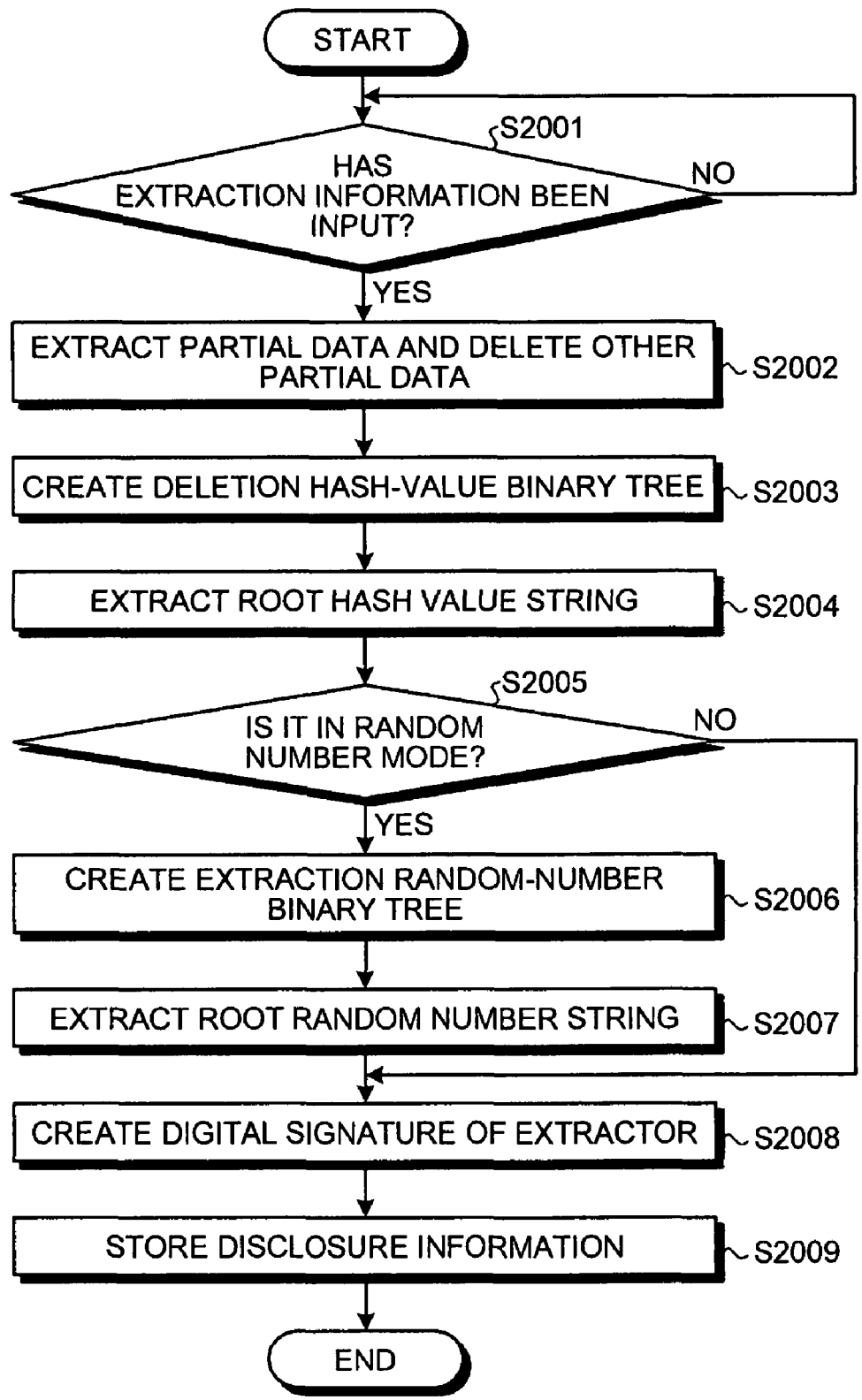
FIG. 20 is a flowchart of a data extraction process performed by the apparatus.

FIG. 20 is a flowchart of a data extraction process performed by the apparatus 100. First, the extracting unit 301 waits for the extraction information indicating an extraction range of the streaming data ST (step S2001: NO).

When the extraction information is input (step S2001: YES), extraction data corresponding to the extraction information is extracted and other partial data is deleted (step S2002). The deletion hash-value binary-tree creating unit 505 creates the deletion hash-value binary tree Td (step S2003), and extracts the root hash value string $L_{hRD}$ therefrom (step S2004).

Subsequently, whether it is in the random number mode is determined (step S2005). When it is in the random number mode (step S2005: YES), the extraction random-number binary-tree creating unit 509 creates the extraction random-number binary tree Tre (step S2006), and the root random number string $L_{rRE}$ is extracted (step S2007). Thereafter, the process proceeds to step S2008. On the other hand, when it is not in the random number mode (step S2005: NO), the process proceeds to step S2008.

The digital-signature processing unit 202 creates the digital signature $S_B$ of an extractor (step S2008). In the normal mode, the digital signature $S_B$ of the extractor is created using the root hash value string $L_{hRD}$.

On the other hand, in the random number mode, the digital signature $S_B$ of the extractor is created using the root hash value string $L_{hRD}$ and the root random number string $L_{rRE}$. In either way, the digital signature $S_B$ can be created by a conventional signature technique. Thereafter, the disclosure information such as the extraction data string $L_{de}$, the digital signature $S_B$ of the extractor, the root hash value string $L_{hRD}$, the root random number string $L_{rRE}$, and the digital signature $S_A$ of the signer is stored (step S2009).

Figure 21:
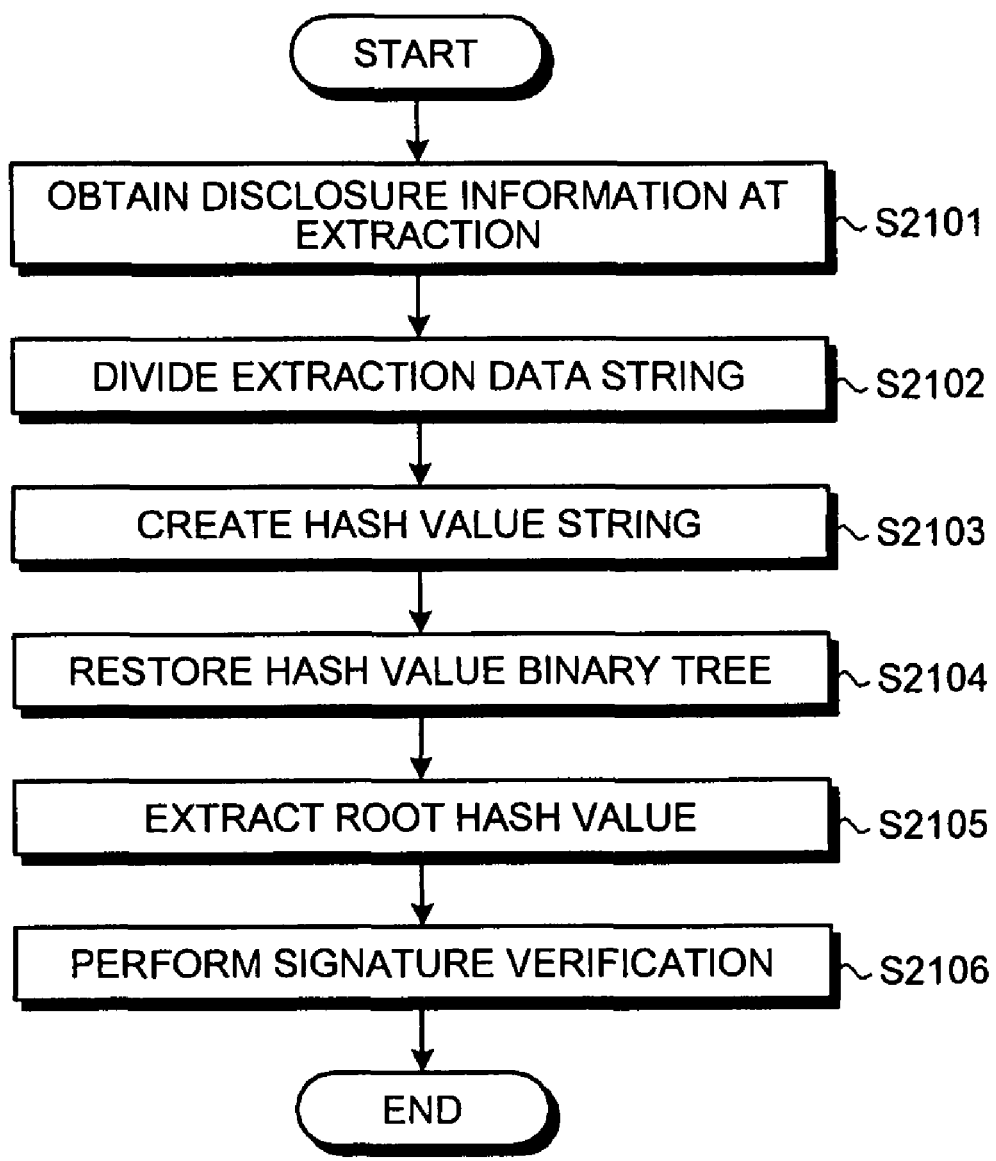
FIG. 21 is a flowchart of a data verification process performed by the apparatus.
Figure 22:
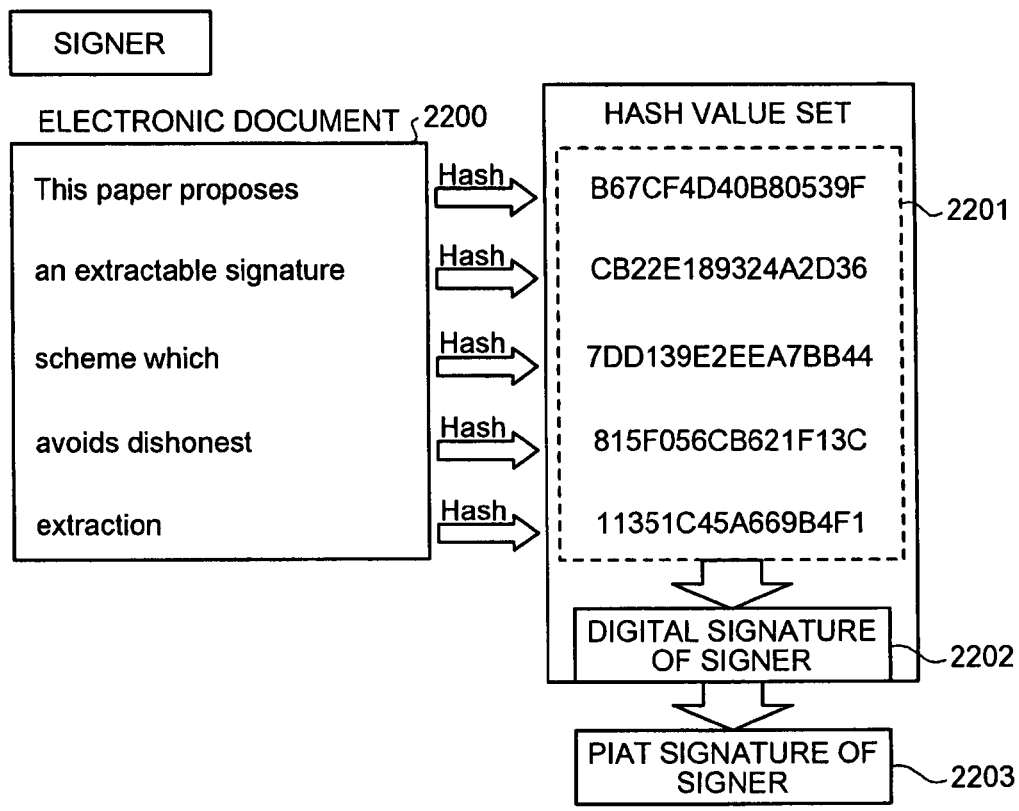
FIG. 22 is a schematic diagram showing an outline of algorism for a signer in PIAT.
Figure 23:
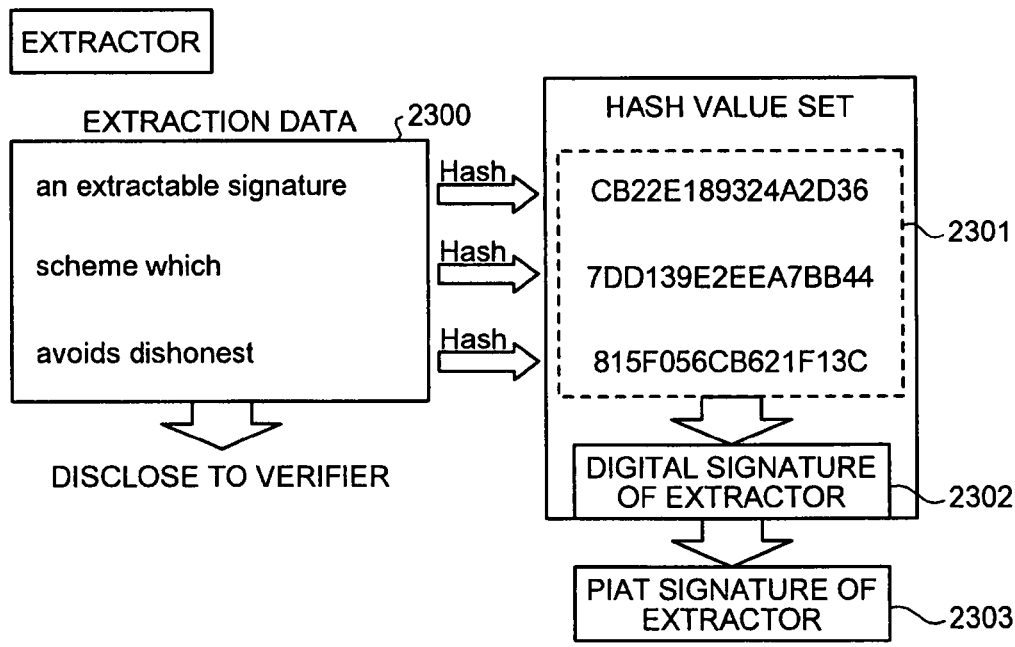
FIG. 23 is a schematic diagram showing an outline of algorism for an extractor in PIAT.
Figure 24:
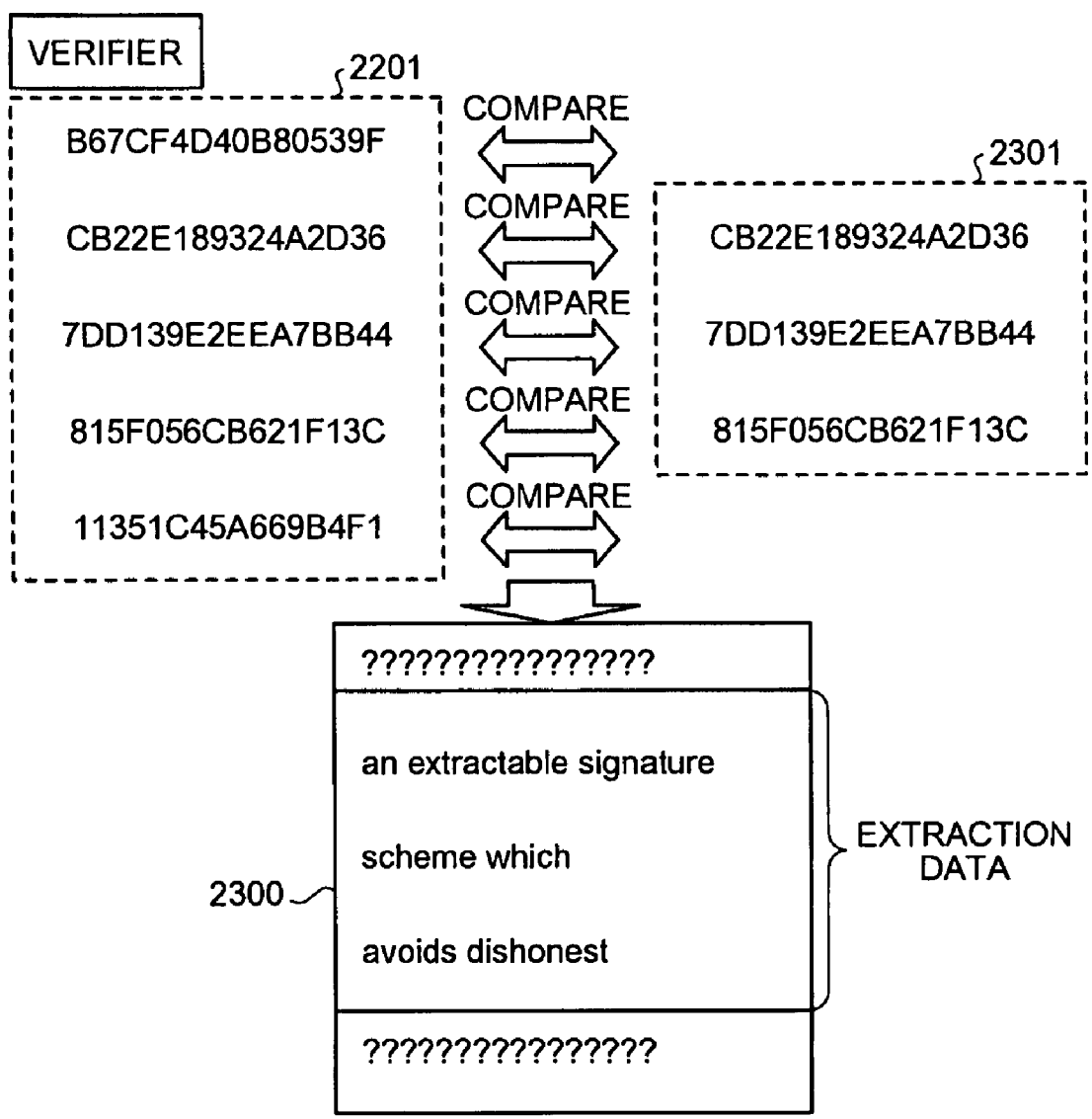
FIG. 24 is a schematic diagram showing an outline of algorism for a verifier in PIAT.
Figure 25:
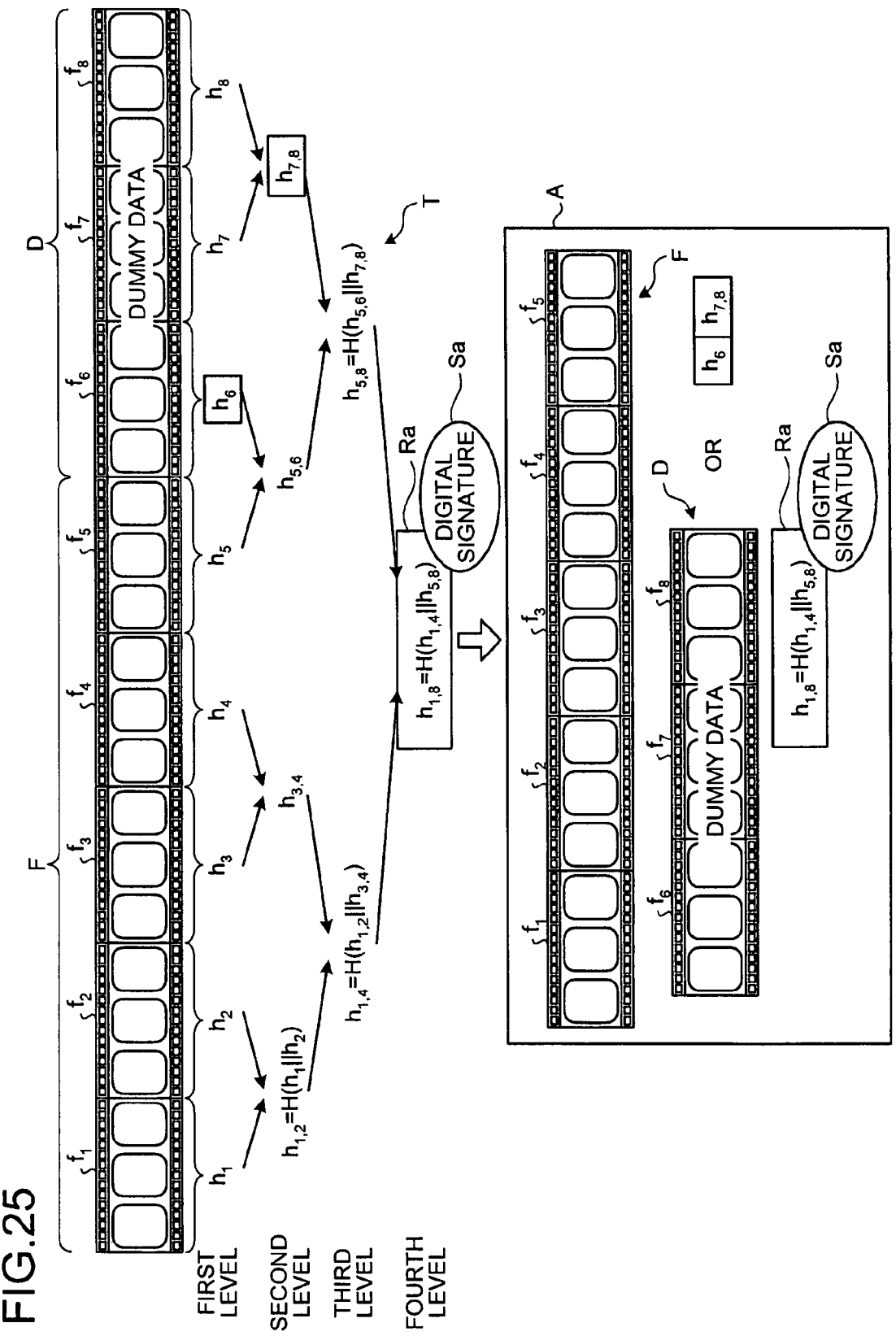
FIG. 25 is a schematic diagram for explaining a signing process performed by a signer in a conventional signature technique in which streaming data of a moving image is a subject of signature.
Figure 26:
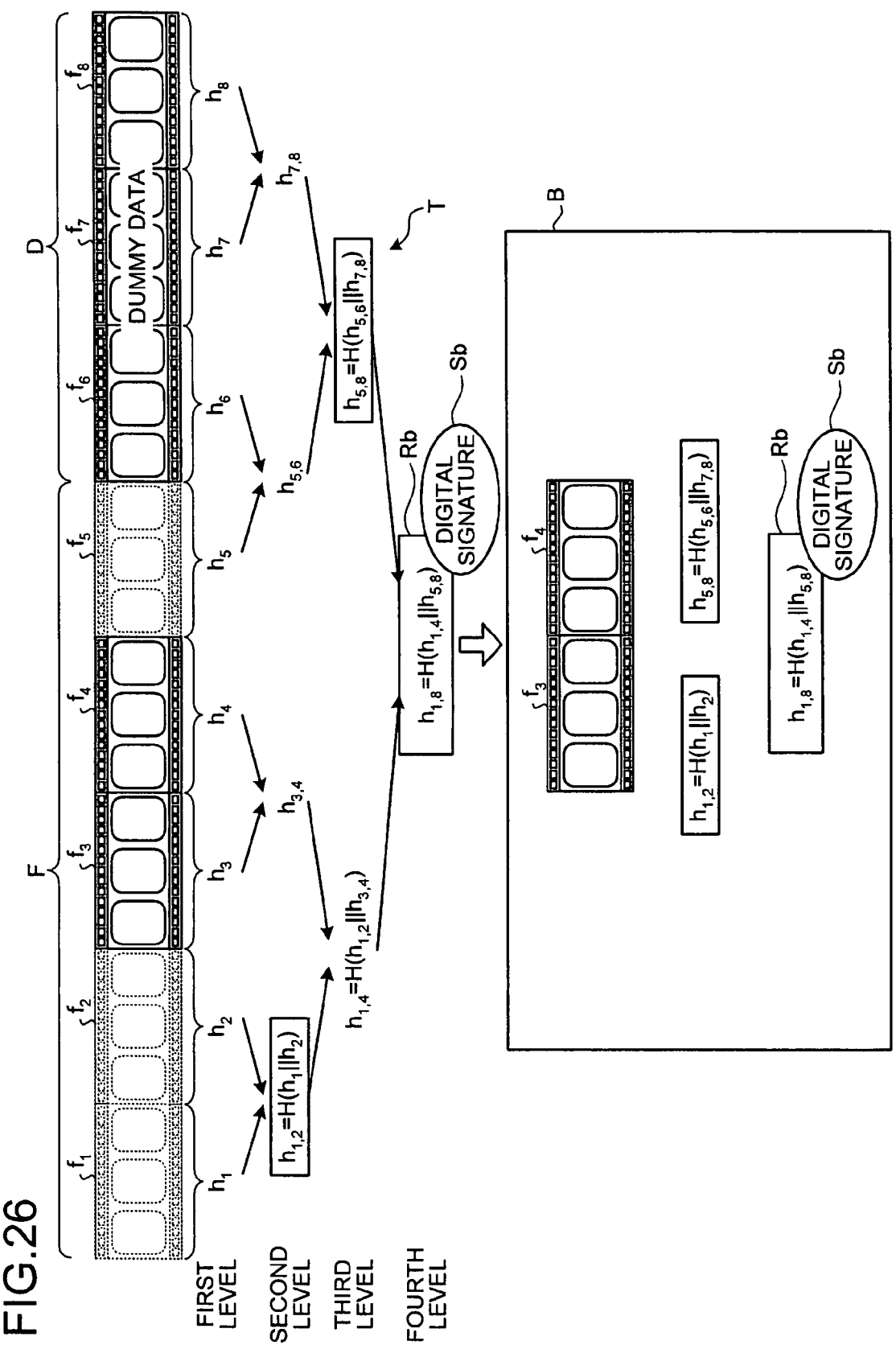
FIG. 26 is a schematic diagram for explaining an extracting process performed by an extractor in the conventional signature technique.
Figure 27:
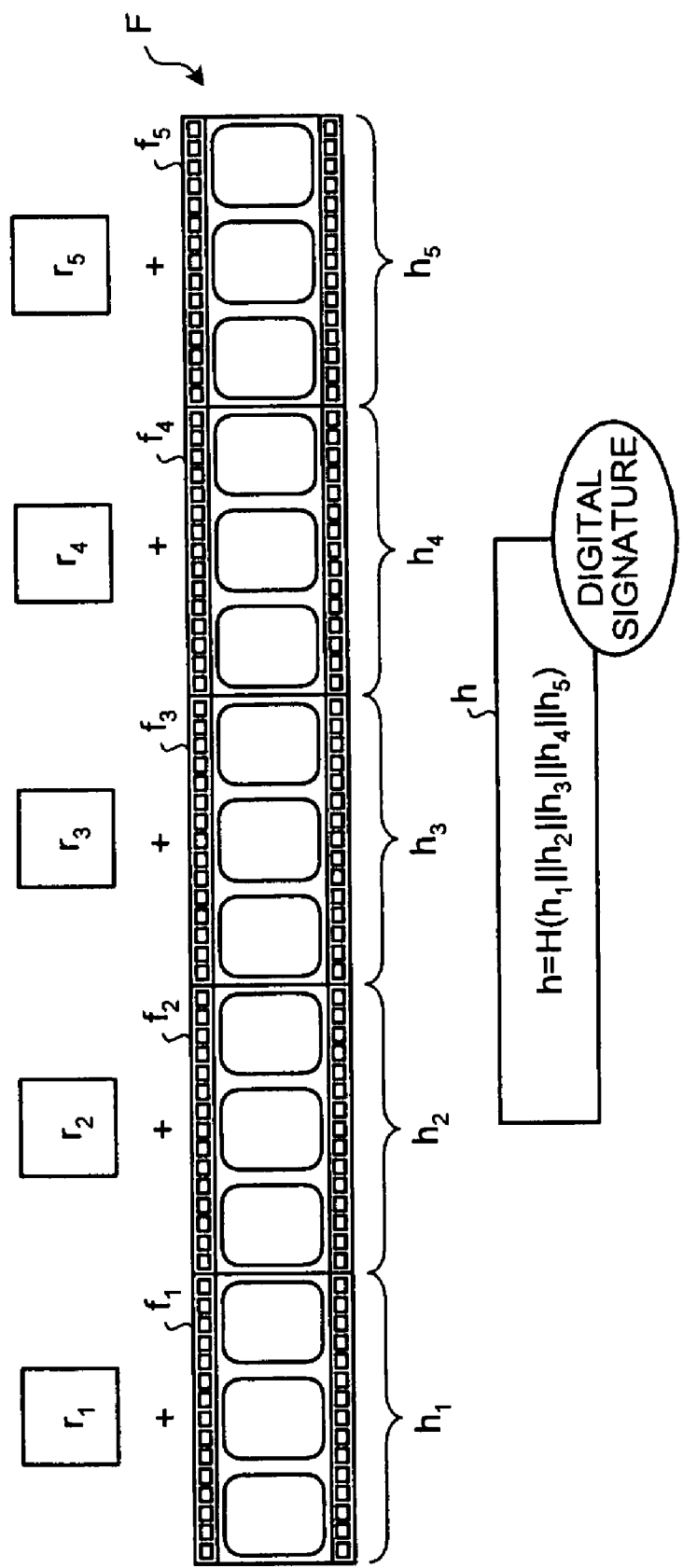
FIG. 27 is a schematic diagram for showing random numbers that are added to partial moving images.
Figure 28:
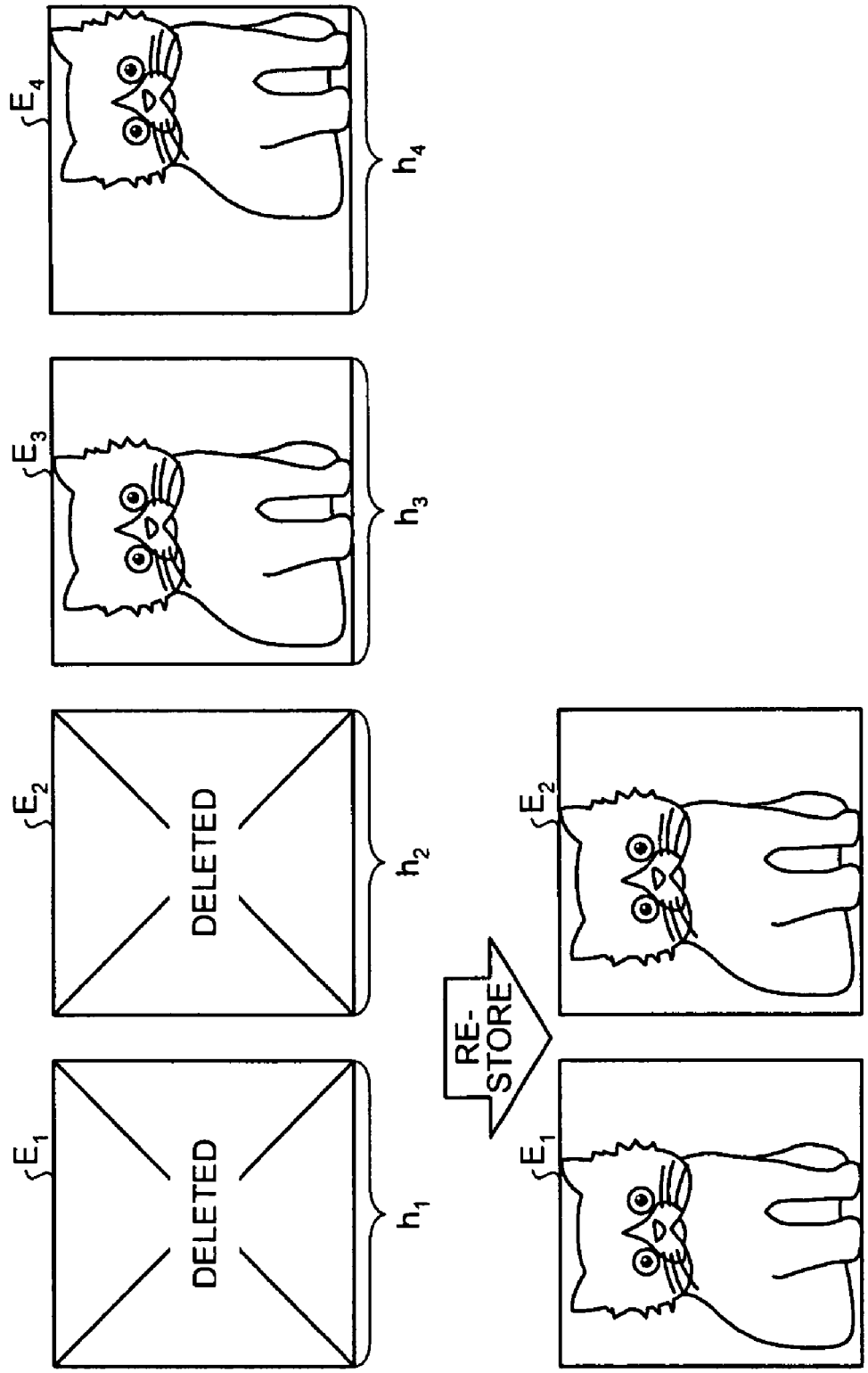
FIG. 28 is a schematic diagram showing a moving image file of an animation.

FIG. 21 is a flowchart of the data verification process performed by the apparatus 100. First, the disclosure information at the time of extraction is obtained (step S2101), and the dividing unit 501 divides the extraction data string $L_{de}$ by a unit of division same as that at the time of signature (step S2102). The hash-value-string creating unit 503 creates a hash value string of each extraction data (step S2103).

The hash-value binary-tree creating unit 504 restores the hash-value binary tree Th using the root hash value string $L_{hRD}$ of the deletion hash-value binary tree Td and the hash value of the extraction data (step S2104). The root hash value $h_R$ of the restored hash-value binary tree Th is extracted (step S2105), and a verification process to verify validity of the digital signatures $S_A$ and $S_B$ of the signer and the extractor is performed using the extracted root hash value $h_R$ (step S2106).

As described above, according to the present embodiment, it is possible to reduce an amount of data at the time of signature and extraction by a large amount. Moreover, at the time of verification, it is possible to confirm that a part of the original streaming data ST is extracted, by the signature verification by calculating the root hash value $h_R$ of the original from the disclosed streaming data ST and the root hash value string $L_{hRD}$ of the deleted part. Furthermore, in the case of the onymous extraction, it is also possible to check who has performed the deletion by verifying the root hash value string $L_{hRD}$ and the signature thereof.

As described, according to the embodiment of the present invention, an amount of data can be reduced by a large amount while maintaining an original guaranteeing function of the streaming data (extraction data string $L_{de}$) that is extracted by PIAT.

Moreover, in the present embodiment, not a complete binary tree but a general binary tree is used. Therefore, the dummy data D is not required to be added as in the conventional technique, and falsification of the original information to the dummy data D is not possible. Furthermore, it is not necessary to store the dummy data or to calculate the hash value of the dummy data. Therefore, an amount of calculation can also be reduced.

Moreover, in the present embodiment, as long as only the root random number $r_R$ is stored, the random-number binary tree Tr can be restored. Therefore, it is not necessary to store all random numbers constituting the random-number binary tree Tr. As a result, an amount of data can be reduced.

Furthermore, in the verification process, the extraction data string $L_{de}$ can be restored by using algorism of the random-number binary tree structure from the disclosed root random number string $L_{rRE}$. By calculating the root hash value $r_R$ of the original from this extraction data string $L_{de}$ and the root hash value string $L_{hRD}$, and by performing the signature verification, it is possible to confirm that a part of the original streaming data ST is extracted. Moreover, in the case of the onymous extraction, by checking the root hash value string $L_{hRD}$ and the digital signature $S_A$ of the signer, it is also possible to identify who has performed the deletion.

As described, according to the present embodiment, even when the PIAT signature is performed on the streaming data ST such as a long moving image or audio data, an amount of required signature data can be reduced by a log order of a data length, and highly useful digital signature can be achieved. FIG. 29 is a table showing effects in reducing an amount of data when a PIAT signature is given to streaming data of a moving image. In FIG. 29, calculation amount H represents the number of calculation of hash values, and R represents the number of creation of random numbers.

As described above, according to the present embodiment, it is possible to guarantee that streaming data being a subject of signature such as a moving image and audio data maintains its original content, to extract data from the subject of signature while protecting privacy, and to reduce an amount of signature-related data by a large amount.

The method of digital signature authentication explained in the present embodiment can be implemented using a computer, such as a personal computer and a work station, to execute a program that is prepared in advance. This program is recorded on a computer-readable recording medium such as a hard disk, a flexible disk, a compact disk read-only memory (CD-ROM), a magneto optical (MO) disk, and a digital versatile disk (DVD), and is executed by being read from the recording medium. This program can be a medium that can be distributed through a network such as the Internet.

Moreover, the apparatus 100 explained in the present embodiment can also be implemented by an application-specific integrated circuit (ASIC) such as a standard cell and a structured ASIC, or a programmable logic device (PLD) such as a field programmable gate array (FPGA). For example, by defining a functional configuration of the apparatus 100 by description of a hardware description language (HDL), and by performing logical synthesis on the HDL description to be provided to ASIC or PLD, the apparatus 100 can be manufactured.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores therein a computer program for digital signature authentication, the computer program causing a computer to execute:
dividing streaming data into a plurality of pieces of partial data in a predetermined unit;
creating a hash value string including a plurality of hash values corresponding to the pieces of partial data;
creating a first binary tree using the hash value string;
creating a digital signature of a signer using a root value of the first binary tree;
extracting partial data from the streaming data;
deleting remaining partial data from the streaming data;
creating a second binary tree using hash values corresponding to the remaining partial data;
outputting the partial data extracted and a root value of the second binary tree;
obtaining a root random number; and
creating a third binary tree using the root random number such that number of leaves of the third binary tree is identical to number of the pieces of partial data, wherein
the creating the first binary tree includes creating the first binary tree based on the leaves and the hash value string.

2. The computer-readable recording medium according to claim 1, wherein the computer program further causes the computer to execute
creating a digital signature of an extractor using the root value of the second binary tree.

3. The computer-readable recording medium according to claim 1, wherein the computer program further causes the computer to execute restoring the first binary tree using a hash value corresponding to the partial data extracted, and the root value of the second binary tree.

4. The computer-readable recording medium according to claim 1, wherein the third binary tree is created based on the number of the pieces of partial data and an equation.

5. The computer-readable recording medium according to claim 4, wherein the leaves includes a plurality of pairs of leaves, each pair of which is branched from an identical branch-root random number, and a leaf left alone.

6. The computer-readable recording medium according to claim 1, wherein the computer program further causes the computer to execute:

extracting, from the third binary tree, a fourth binary tree having a leaf corresponding to the partial data extracted; and outputting the fourth binary tree and the partial data extracted.

7. An apparatus for digital signature authentication, comprising:

a dividing unit that divides streaming data into a plurality of pieces of partial data in a predetermined unit;

a first creating unit that creates a hash value string including a plurality of hash values corresponding to the pieces of partial data;

a second creating unit that creates a first binary tree using the hash value string;

a third creating unit that creates a digital signature of a signer using a root value of the first binary tree;

an extracting unit that extracts partial data from the streaming data;

a deleting unit that deletes remaining partial data from the streaming data;

a fourth creating unit that creates a second binary tree using hash values corresponding to the remaining partial data;

an outputting unit that outputs the partial data extracted and a root value of the second binary tree;

an obtaining unit that obtains a root random number and;

a fifth creating unit that creates a third binary tree using the root random number such that number of leaves of the third binary tree is identical to number of the pieces of partial data, wherein the second creating unit creates the first binary tree based on the leaves and the hash value string.

8. A method of digital signature authentication, comprising:

dividing streaming data into a plurality of pieces of partial data in a predetermined unit;

creating a hash value string including a plurality of hash values corresponding to the pieces of partial data;

creating a first binary tree using the hash value string;

creating a digital signature of a signer using a root value of the first binary tree;

extracting partial data from the streaming data;

deleting remaining partial data from the streaming data;

creating a second binary tree using hash values corresponding to the remaining partial data;

outputting the partial data extracted and a root value of the second binary tree;

obtaining a root random number; and creating a third binary tree using the root random number such that number of leaves of the third binary tree is identical to number of the pieces of partial data, wherein the creating the first binary tree includes creating the first binary tree based on the leaves and the hash value string.

* * * * *

UNITED STATES PATENT AND TRADEMARK OFFICE
CERTIFICATE OF CORRECTION

PATENT NO. : 8,037,312 B2  
APPLICATION NO. : 11/984314  
DATED : October 11, 2011  
INVENTOR(S) : Masahiko Takenaka et al.

Page 1 of 1

It is certified that error appears in the above-identified patent and that said Letters Patent is hereby corrected as shown below:

Title Page, Column 2 item (56) (Other Publications), Line 6, Delete "0815220.3" and insert --08152220.3--, therefor.

Signed and Sealed this  
Thirteenth Day of December, 2011

David J. Kappos  
*Director of the United States Patent and Trademark Office*